United States Patent
Gupta et al.

(10) Patent No.: US 6,546,405 B2
(45) Date of Patent: *Apr. 8, 2003

(54) ANNOTATING TEMPORALLY-DIMENSIONED MULTIMEDIA CONTENT

(75) Inventors: Anoop Gupta, Medina, WA (US); Anthony W. Cannon, Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,871

(22) Filed: Oct. 23, 1997

(65) Prior Publication Data

US 2002/0059342 A1 May 16, 2002

(51) Int. Cl.[7] .............................................. G06F 15/00

(52) U.S. Cl. ....................................... 707/512; 345/691

(58) Field of Search ................................. 707/512, 500, 707/501, 515, 517, 520, 526, 102, 104; 395/117, 851; 345/302, 433, 435, 475, 118, 148, 326, 335, 691

(56) References Cited

U.S. PATENT DOCUMENTS

| | | |
|---|---|---|
| 4,675,532 A | 6/1987 | Carson |
| 4,750,367 A | 6/1988 | Bernatets |
| 4,827,533 A | 5/1989 | Tanaka |
| 4,931,950 A | 6/1990 | Isle et al. ................... 364/513 |
| 4,941,190 A | 7/1990 | Joyce |
| 4,982,280 A | 1/1991 | Lyon et al. |
| 5,091,925 A | 2/1992 | Haendle et al. |
| 5,119,474 A | 6/1992 | Beitel et al. ................ 395/154 |
| 5,253,045 A | 10/1993 | Lippel |
| 5,274,758 A | 12/1993 | Beitel et al. ................ 395/154 |
| 5,309,237 A | 5/1994 | Singh |
| 5,329,314 A | 7/1994 | Correa et al. |
| 5,335,019 A | 8/1994 | Herz et al. |

(List continued on next page.)

OTHER PUBLICATIONS

Moura, J.M., et al., "Retrieving Quality Video Across Hetergeneous Networks—Video Over Wireless", *IEEE Personal Communications*, 44–54, (Feb. 1996).

Primary Examiner—Alford W. Kindred
(74) Attorney, Agent, or Firm—Lee & Hayes, PLLC

(57) ABSTRACT

A human viewing temporally-dimensioned content of a multimedia document through use of a computer can add substantive content to temporally-dimensioned content of the multimedia document to thereby annotate, comment upon, and augment the multimedia document. Thus, a multimedia document becomes a basis for collaborative work. The substantive content added by the viewing user is in the form of a temporal annotation which identifies a particular relative time in temporally-dimensioned content of the multimedia document and which includes user-authored content provided by the viewing user. Display of the multimedia document includes presentation of the temporal annotations created by the user. A graphical user interface enables the user to select a temporal annotation from a list and immediately proceed to presentation of the multimedia document such that temporally-dimensioned content is presented at the particular relative time represented by the selected temporal annotation. In addition, as temporally-dimensioned content of the multimedia document is displayed, temporal annotations are represented in the display of the multimedia document as the particular relative time represented by each temporal annotation is reached. Thus, the user-authored content becomes part of the display of the multimedia document in a temporal context.

77 Claims, 11 Drawing Sheets

U.S. PATENT DOCUMENTS

| | | | |
|---|---|---|---|
| 5,396,497 A | 3/1995 | Veltman | |
| 5,455,910 A | 10/1995 | Johnson et al. | 395/650 |
| 5,481,543 A | 1/1996 | Veltman | |
| 5,502,727 A | 3/1996 | Catanzaro et al. | |
| 5,512,938 A | 4/1996 | Ohno | |
| 5,521,918 A | 5/1996 | Kim | |
| 5,524,193 A * | 6/1996 | Covington et al. | 395/154 |
| 5,533,021 A | 7/1996 | Branstad et al. | 370/60.1 |
| 5,537,408 A | 7/1996 | Branstad et al. | 370/79 |
| 5,555,028 A | 9/1996 | Kim | |
| 5,561,724 A | 10/1996 | Kido et al. | |
| 5,583,652 A | 12/1996 | Ware | |
| 5,583,980 A * | 12/1996 | Anderson | 395/173 |
| 5,592,231 A | 1/1997 | Clatanoff et al. | |
| 5,596,700 A * | 1/1997 | Darnell et al. | 395/340 |
| 5,600,775 A * | 2/1997 | King et al. | 395/806 |
| 5,623,690 A | 4/1997 | Palmer et al. | 395/806 |
| 5,625,833 A * | 4/1997 | Levine et al. | 395/800 |
| 5,664,044 A | 9/1997 | Ware | |
| 5,731,840 A | 3/1998 | Kikuchi et al. | |
| 5,764,307 A | 6/1998 | Ozcelik et al. | |
| 5,768,440 A | 6/1998 | Campanelli et al. | |
| 5,768,533 A | 6/1998 | Ran | |
| 5,771,318 A | 6/1998 | Fang et al. | |
| 5,809,250 A * | 9/1998 | Kisor | 395/200.57 |
| 5,812,702 A | 9/1998 | Kundu | |
| 5,826,025 A * | 10/1998 | Gramlich | 395/200.47 |
| 5,832,134 A | 11/1998 | Avinash et al. | |
| 5,844,627 A | 12/1998 | May et al. | |
| 5,884,004 A | 3/1999 | Sato et al. | |

* cited by examiner

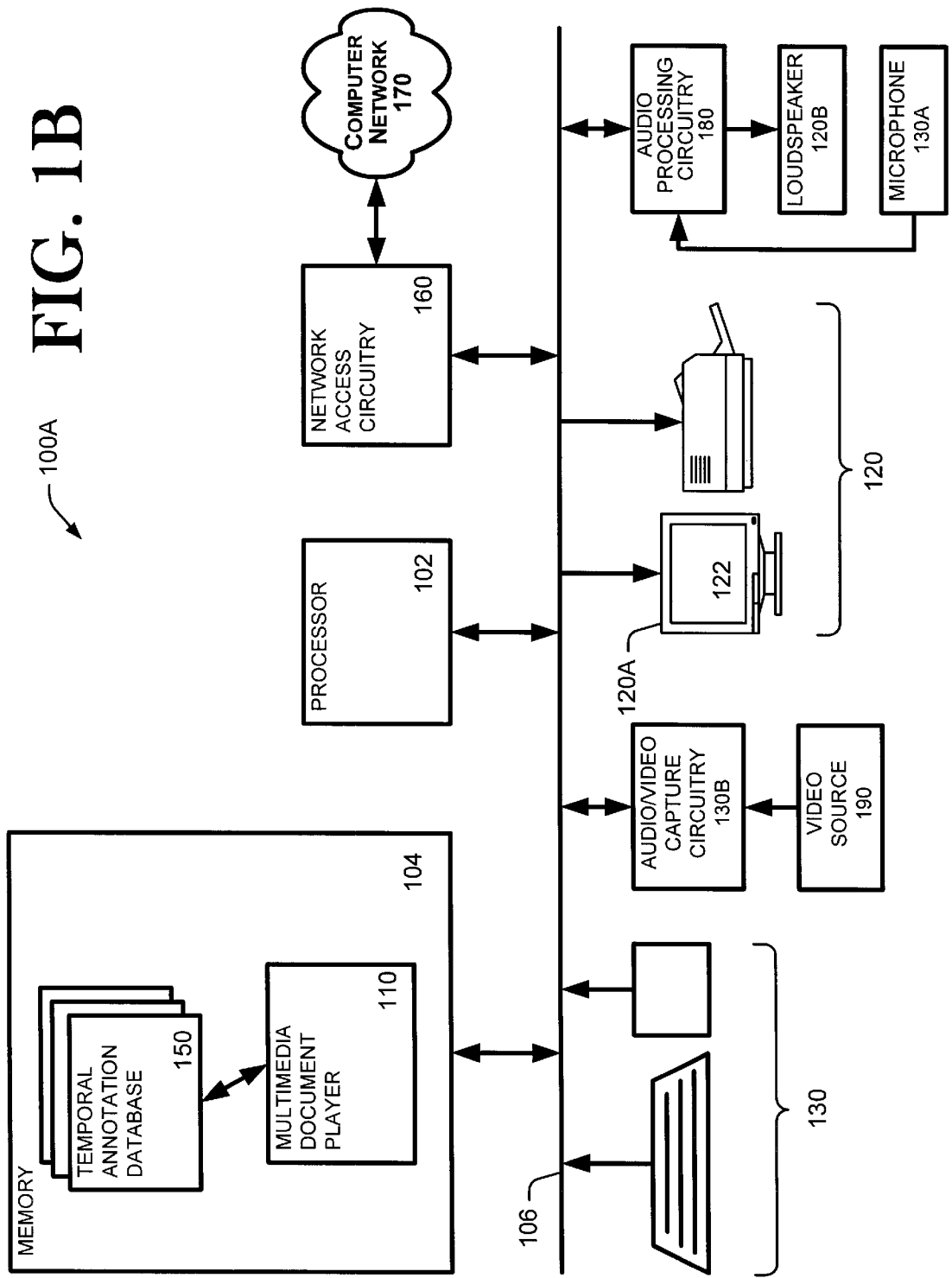

ANNOTATING TEMPORALLY-DIMENSIONED MULTIMEDIA CONTENT

FIELD OF THE INVENTION

The present invention relates to computer-based multimedia document viewing and, in particular, to a novel mechanism by which temporal annotations are added to a multimedia document.

BACKGROUND OF THE INVENTION

Information presentation has changed dramatically in recent years. Dramatic increases in computational capacity of home-based computer systems and proliferation of multimedia devices such as color monitors, graphics processing cards, sound processing cards, and video capture cards has made multimedia presentation of information ubiquitous. Such multimedia presentation includes text, graphics, and streaming video and audio content. For example, a multimedia presentation of a college course lecture can include motion video and audio of a live or pre-recorded lecture and a table of contents for the lecture to assist a human viewer in following the substance of the lecture. Multimedia presentations provide large amounts of information in a dense form in which juxtaposition of text, graphics, motion video, and audio convey much more information than can be conveyed using text and/or graphics alone. Such information includes voice inflection of a speaker, sounds, non-verbal communication of a speaker, or simply a perspective provided by similar information in various forms juxtaposed in a single multimedia document.

At the same time, computers are more interconnected now than ever. Both local area and wide area networks are growing in number at a tremendous rate. In addition, the number of computers connected to the Internet, a wide area network which reaches nearly every part of the planet, is growing at a phenomenal rate. Thus, computers are increasingly sharing information with other computers, frequently across national and continental boundaries. Some communications protocols supported on the Internet, e.g., the Hypertext Transfer Protocol (HTTP) and Realtime Transport Protocol(RTP) which are used on a portion of the Internet referred to as the World Wide Web, support retrieval of multimedia documents across the Internet. Accordingly, the dense presentation of information afforded by multimedia is accessible to a tremendous number of people worldwide.

The benefits of multimedia presentation of information and of wide connectivity of computers are being used to great advantage in academia and in corporations. For example, in academia, course lectures in streaming video and audio format are made available worldwide through the World Wide Web. Any improvements in, or added functionality to, multimedia presentation of information have far reaching benefits and value to national and international exchange of information and knowledge.

One such desirable added functionality is the ability to enable collaboration in which various users can add content in the form of annotations to multimedia documents. Currently, adding content to a multimedia document or associated web pages requires write access to the multimedia document and/or associated web pages such that content can be added directly into the multimedia document. However, it is Often preferred that the content of various multimedia documents as originally authored be preserved. For example, a user or a group of users may which to add personal comments to a multimedia document such that the comments are only accessible to the user or group. The original author of the multimedia document may wish that other users can view the multimedia document without viewing the comments of the user or group and therefore prefers that the original content of the multimedia document is preserved. Such preservation typically requires denying write access to viewers of the documents. What is therefore needed is a mechanism by which viewers of multimedia documents can add annotations to such multimedia documents without granting such viewers write access to such multimedia documents.

SUMMARY OF THE INVENTION

In accordance with the present invention, a viewer of a multimedia document through use of a computer can add substantive content to the multimedia document to thereby annotate, comment upon, and augment the multimedia document even if the viewer has no write access to the multimedia document. Thus, a multimedia document becomes a basis for collaborative work. The substantive content added by the viewing user is in the form of a temporal annotation which identifies a particular relative time in temporally-dimensioned content of the multimedia document and which includes user-authored content provided by the viewing user. The temporally-dimensioned content can include, for example, animations, slide shows, motion video, and audio content. The user-authored content can include, for example, textual comments of the viewing user regarding the particular substance of the temporally-dimensioned content at the particular relative time in the multimedia document. The user-authored content can further include, for example, graphics, motion video, audio, and/or hypertext links to other multimedia documents. In addition, the temporal annotations can themselves be multimedia documents which can be augmented by other temporal annotations.

A multimedia document player recognizes an association between the temporal annotations and the multimedia document and incorporates and synchronizes display of the temporal annotations with the display of the multimedia document. Thus, display of the multimedia document includes presentation of the temporal annotations created by the user. Specifically, as temporally-dimensioned content of the multimedia document is displayed, temporal annotations are represented in the display of the multimedia document as the particular relative time represented by each temporal annotation is reached. Thus, the user-authored content becomes part of the display of the multimedia document in a temporal context. The user can select temporal annotations which satisfy various criteria for inclusion in the display of the multimedia document, e.g., temporal annotations created by a particular user or created since a particular date, for inclusion in the presentation of the multimedia document. In addition, the user can use temporal annotations to control playback of the multimedia document. Specifically, a graphical user interface of the multimedia document player enables the user to jump within the playback of a multimedia document to a particular relative time associated with a temporal annotation, Specifically, the user can select a temporal annotation from a list, and playback of the multimedia document by the multimedia document player immediately proceeds to presentation of the multimedia document such that temporally-dimensioned content is presented at the particular relative time represented by the selected temporal annotation.

The temporal annotations can be private or public. A private temporal annotation is displayed only to the specific user that created the temporal annotation when displaying the multimedia document. One user viewing the multimedia document does not see the content added by temporal annotations of another user viewing the same multimedia document. A public temporal annotation is stored in publicly accessible storage, e.g., on a shared server on the Internet, such that display of the multimedia document can include user-authored content of any temporal annotations stored in the publicly accessible memory. Such user-authored content created by other users thus becomes part of the multimedia document. General conventional access rights which control access to other computer resources, e.g., specific peripheral devices or data files stored in computer memory, can be used to control access by a user to temporal annotations created by another user. Such access rights can identify specific users and/or groups of users and can authorize specific types of access for each user or group, namely, read, write, delete, and create access.

In practice, private temporal annotations are used by a user to make personal notes and comments regarding the substantive content of a multimedia document. For example, a student can annotate a multimedia presentation of a course lecture with personal notes and links to related information. Public temporal annotations can be used by a group of viewing users to perform collaborative work. For example, a multimedia document can include motion video of a proposed video story for a news broadcast. The multimedia document can be made available to a group of people who collaborate to collectively make decisions regarding the final form of the video story. Since computer networks reach globally, the people can be distributed throughout the world and can still each review the multimedia document. When one of the collaborating people creates a public temporal annotation which is associated with a particular relative time of the temporally-dimensioned content, e.g., motion video and audio content, of the multimedia document, the public temporal annotation becomes part of the multimedia document such that subsequent viewing of the multimedia document by others of the group causes display of the added content of the public temporal annotation within a temporal context. Thus, the other collaborating people can view the content of the public temporal annotation in the temporal context of the motion video and audio content of the multimedia document and can incorporate their own comments in the form of additional public temporal annotations.

Thus, in accordance with the present invention, multimedia documents can be made living documents in that those who view multimedia documents can add to the substantive content of the multimedia documents within a temporal context. Such multimedia documents become the collective work of all who view, and choose to add to the substantive content of, those multimedia documents.

BRIEF DESCRIPTION OF THE DRAWINGS

FIG. 1B is a block diagram of a client computer system of the computer network of FIG. 1A which includes a temporal annotation database and a multimedia document player in accordance with the present invention.

DETAILED DESCRIPTION

Figure 1A:
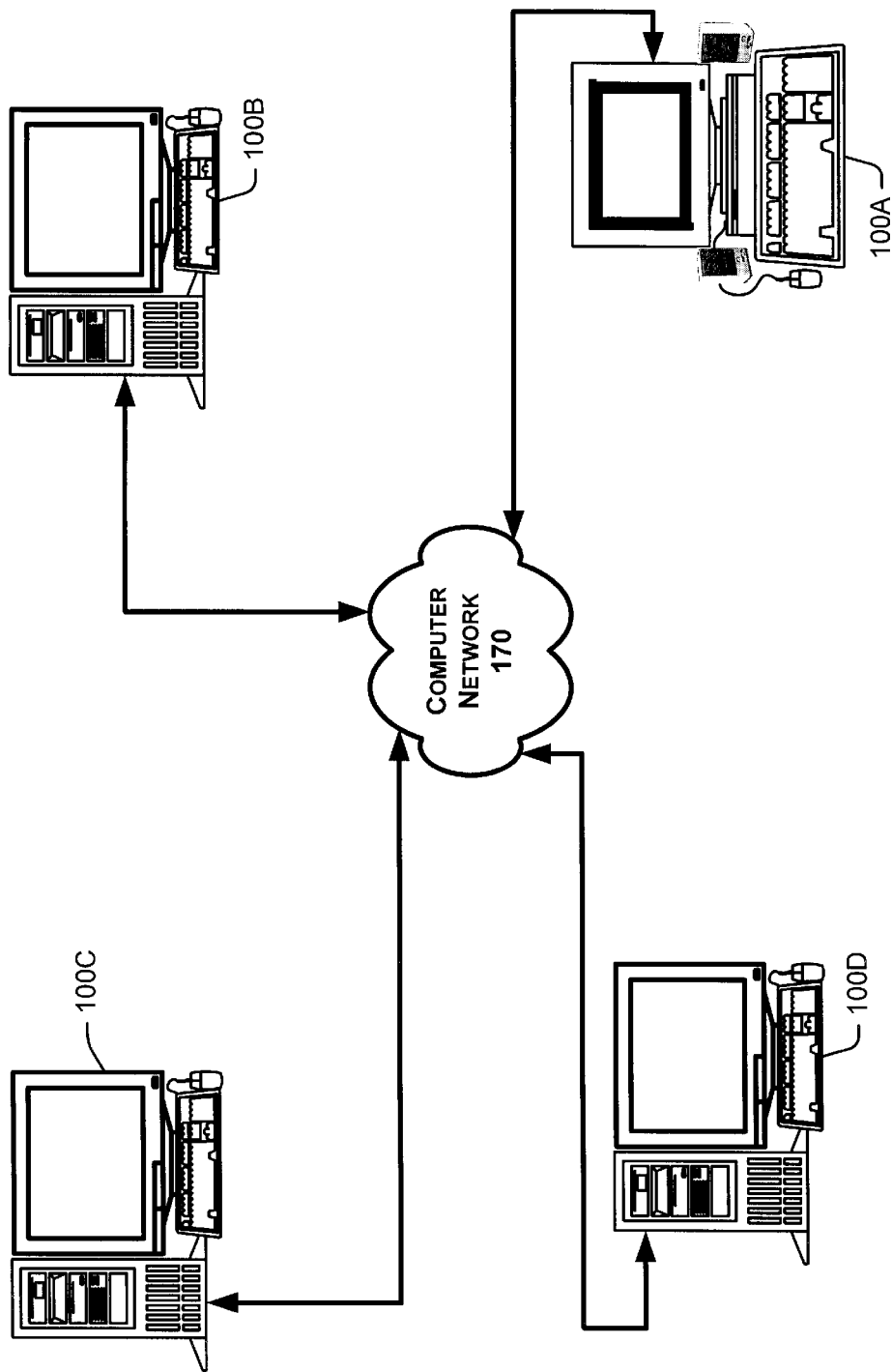
FIG. 1A is a block diagram of a computer network throughout which a multimedia document can be stored.

In accordance with the present invention, a viewer of a multimedia document 140 (FIG. 1C) which is shown to be stored in two parts 140A and 140B and which includes temporally-dimensioned content can add to the substantive content of multimedia document 140 and associate the added content with a particular time in the temporally-dimensioned content by creating a temporal annotation. Multimedia document 140 can be, for example, a hypertext markup language (HTML) document which can include text—and by reference through HTML tags—graphical images, motion video, audio, slide shows, and links to other HTML documents. Multimedia document 140 can alternatively be a motion video or audio file. The temporal annotation is stored in a temporal annotation database 150 such that display of multimedia document 140 by a multimedia document player 110 includes and synchronizes display of the substantive content of the temporal annotation. By storing the temporal annotation in temporal annotation database 150 and independently of multimedia document 140, the temporal annotation can be created by a viewer who does not have write access to multimedia document 140. In effect, the authority to annotate multimedia document 140 is now distinct from the authority to write to multimedia document 140.

The temporal annotation is represented by a temporal annotation entry 300 (FIG. 3) and includes user-authored content in content field 310 which is added to the displayed content of multimedia document 140 within a temporal context. Temporal annotation entry 300 is described below in greater detail. In a manner described more completely below, a multimedia document can be annotated by public temporal annotations created by various users to facilitate collaborative work. As described below more completely, a temporal annotation created by a user can itself be a multimedia document which is annotated by another temporal annotation.

In one embodiment, temporal annotations are retrieved from a temporal annotation database 150 (FIG. 1C) for use in displaying multimedia document 140 by a multimedia document player 110 which is implemented in client computer system 100A. Multimedia document 140 is retrieved from a server computer system 100B for display by multimedia document player 110. Client computer system 100A is coupled to server computer systems 100B–D (FIG. 1A) through a computer network 170. Client computer system 100A, server computer systems 100B–D, and computer network 170 are described in greater detail below. While it is shown that multimedia document 140 and temporal annotation database 150 are stored within server computer system 100B and client computer system 100A, respectively, it is appreciated that multimedia document 140 can also be stored locally within client computer system 100A and that temporal annotation database 150 can be stored remotely, e.g., within either of server computer systems 100B–C. In addition, multimedia document player 110 can also be retrieved through computer network 170 from any of server computer systems 100B for execution within client computer system 100A.

Figure 1C:
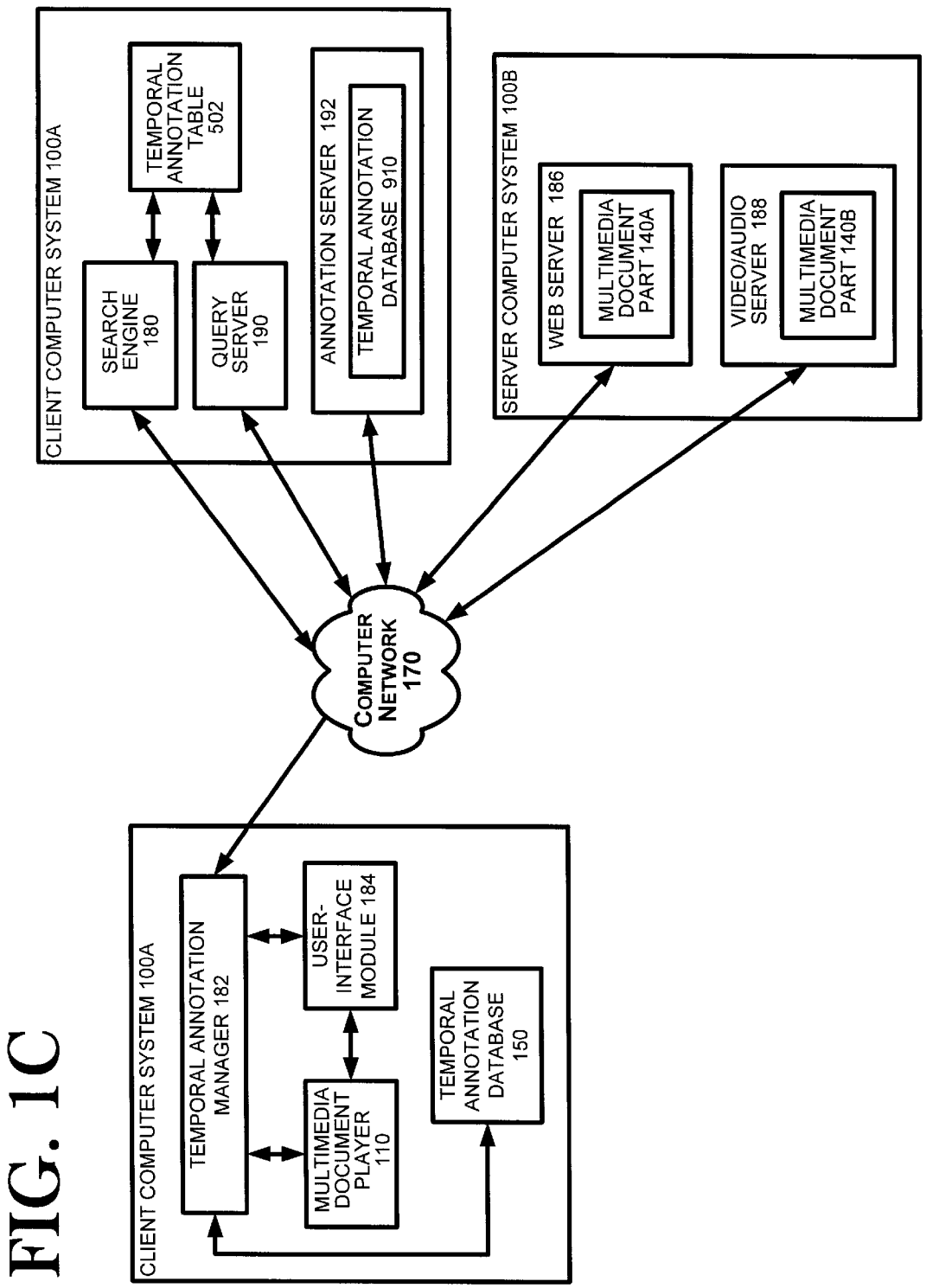
FIG. 1C is a block diagram showing the temporal annotation database and multimedia document player in the client computer system of FIG. 1B and a multimedia document stored in a server computer system of FIG. 1A.
Figure 2:
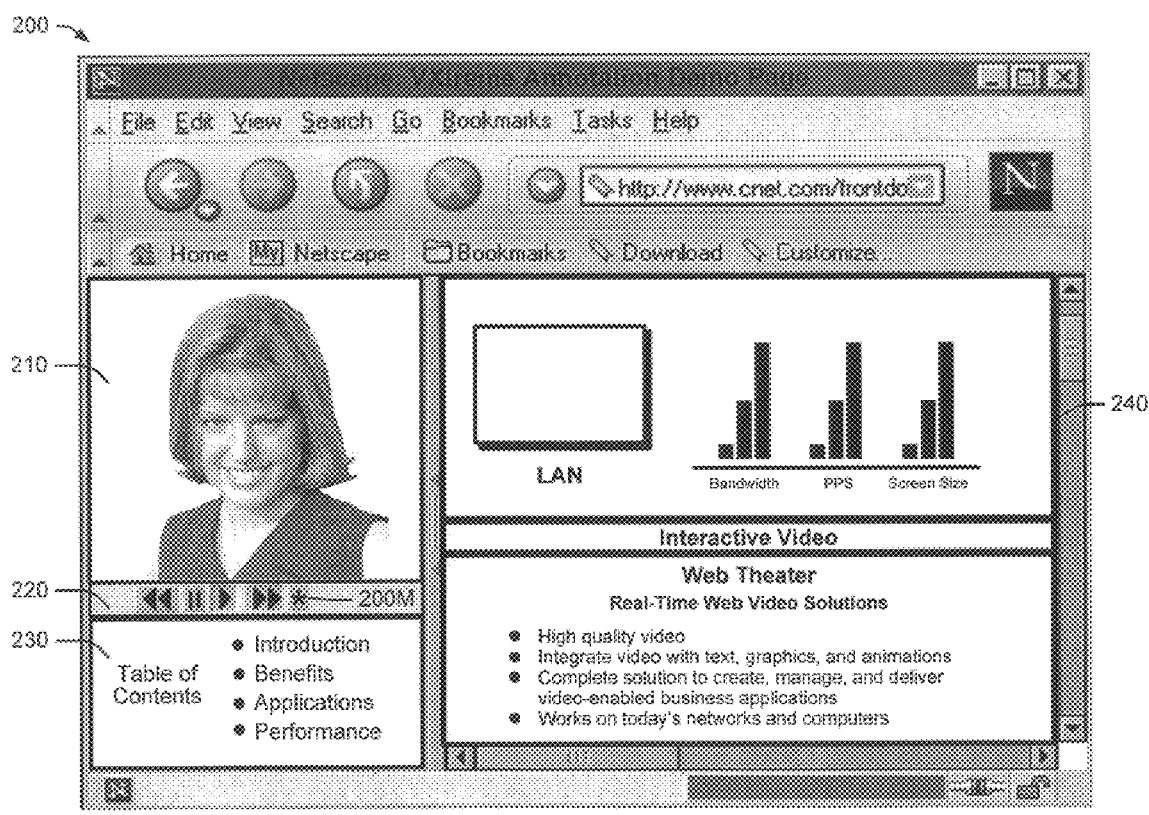
FIG. 2 is a screen view of a multimedia display of the client computer system of FIG. 1A.

FIG. 2 is an illustrative example of a display 200 in display screen 122 (FIG. 1B) of the content of multimedia document 140 (FIG. 1C). Display 200 (FIG. 2) includes a video window 210, a set of video playback control buttons 220, a table of contents 230, and an HTML page window 240. Multimedia document player 110 (FIG. 9) displays motion video content 902 of multimedia document 140 in video window 210 (FIG. 2). Motion video content 902 (FIG. 9) is generally a sequence of frames, each of which is a single graphical image in a motion video image. Each of the frames of motion video content 902 is associated with a particular time which is generally relative to a base time associated with the first frame of motion video content 902. Multimedia document player 110 includes a temporal display module 956 which retrieves frames from motion video content 902 and displays those frames through a display output module 958 at the relative time of each retrieved frame. The relative time of a currently displayed frame of motion video content 902 is stored as a current relative time 960.

Current relative time 960 provides a good temporal context for temporal annotations. Display of motion video content 902 by temporal display module 956 is synchronized in that each frame is displayed at approximately the relative time indicated by the time of the frame. In addition, temporal display module 956 uses current relative time 960 to synchronize playback of motion video content 902, audio content 904, annotation stream 912, and any other temporally-dimensioned content such as animations and slide shows. For example, each individual sample of a digitized sound, each graphical image of an animation, and each individual document of a slide show is associated with a relative time in the same temporal context of motion video content 902 and is presented to the user generally as current relative time 960 reaches the associated relative time of each sample, graphical image, and document, respectively. Accordingly, associating a temporal annotation with a particular relative time as represented in current relative time 960 places the temporal annotation in a temporal context of the temporally-dimensioned content of multimedia document 140. Accordingly, multimedia document player 110 can synchronize display of temporal annotations with display of the temporally-dimensioned content of multimedia document 140, e.g., motion video content 902, audio content 904, and annotation stream 912.

Control buttons 220 (FIG. 2) provide a user interface by which a human user actively controls display of multimedia document 140 (FIG. 1C) in display 200 (FIG. 2). Use of buttons in a graphical user interface (sometimes referred to herein as GUI buttons) is well known but is described below briefly for completeness. Control buttons 220 include GUI buttons by which a user can play, stop, pause, fast forward, and reverse playback of temporally-dimensioned content, e.g., motion video content 902 and audio content 904 (FIG. 9), in video window 210 (FIG. 2) and loudspeaker 120B (FIG. 1B), respectively, by temporal display module 956 (FIG. 9).

Figure 9:
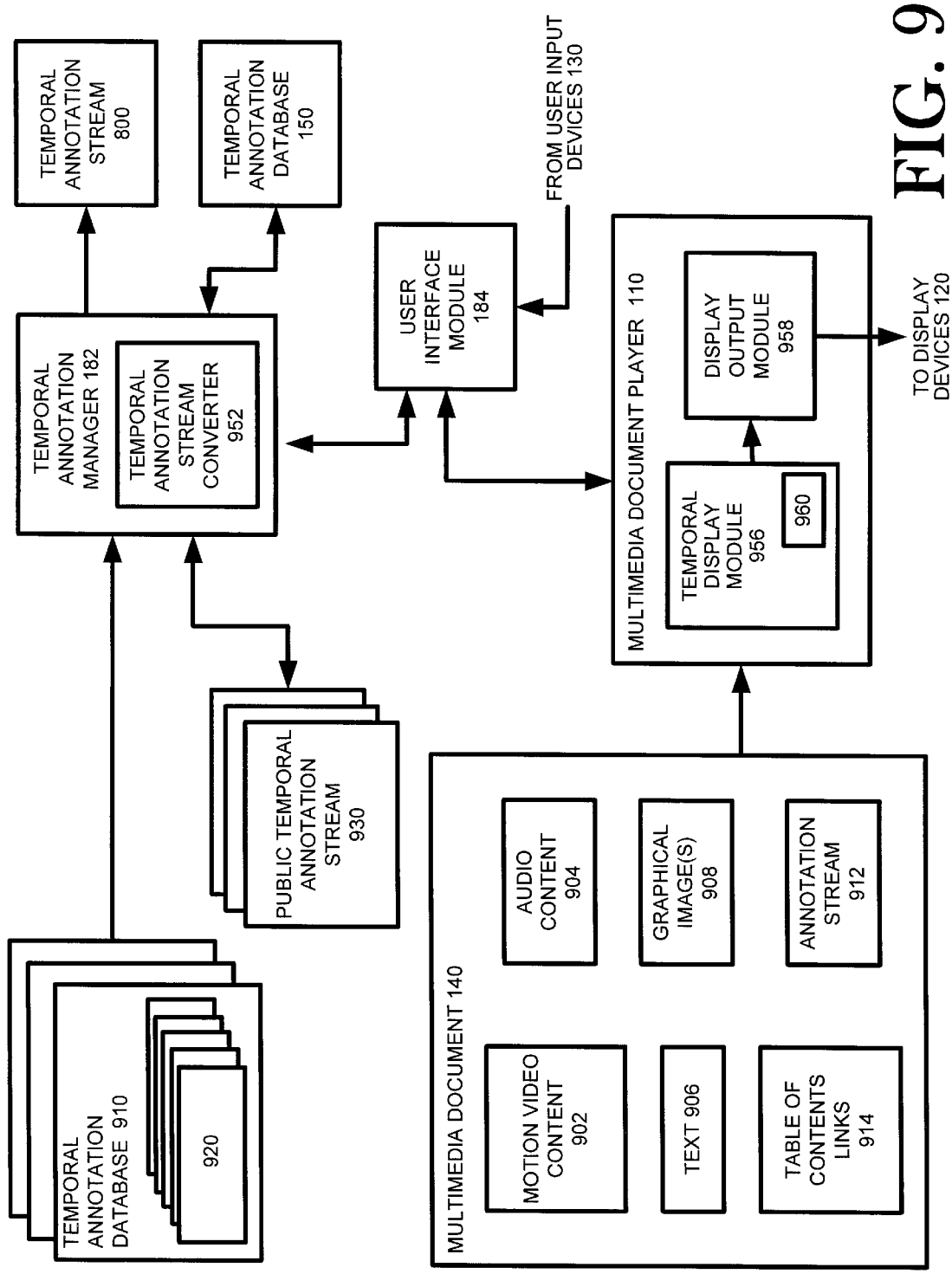
FIG. 9 is a block diagram of the multimedia document and multimedia document player of FIG. 1C in greater detail.

Table of contents 230 (FIG. 2) generally includes a list of topical headings representing an organizational structure of the substantive content of multimedia document 140 (FIG. 9). Table of contents links 914 includes data representing each heading and an associated relative time in the synchronized playback of motion video content 902 and audio content 904 in video window 210 (FIG. 2) and loudspeaker 120B (FIG. 1B), respectively. Each heading of table of contents 230 (FIG. 2) therefore is associated with a relative time in the playback of temporally-dimensioned content of multimedia document 140 (FIG. 9). In addition, each heading of table of contents 230 (FIG. 2) is active in that user interface module 184 (FIG. 9) detects actuation of any of the headings using conventional user interface techniques and, in response thereto, directs temporal display module 956 to jump to the particular time associated with the actuated heading. In jumping to a particular time, temporal display module 956 sets current relative time 960 to the particular time and resumes playback of the substantive content of multimedia document 140. Specifically, multimedia document player 110 (i) displays in video window 210 (FIG. 2) a frame of motion video content 902 (FIG. 9) near the particular time and continues motion video playback of motion video content 902 from that frame, and (ii) reproduces in loudspeaker 120B (FIG. 1B) a sample of audio content 904 near the particular time. In this way, multimedia document player 110 synchronizes playback of audio content 904 such that audio content associated with that particular relative time is reproduced and synchronized with playback of motion video content 902. Table of contents 230 (FIG. 2) allows a user to view a particular portion of temporally-dimensioned content of multimedia document 140 (FIG. 9) without requiring playback of the entirety of the temporally-dimensioned content of multimedia document 140.

HTML page window 240 (FIG. 2) includes representation of text 906 (FIG. 9) and static graphical images 908 of multimedia document 140 in a hypertext markup language (HTML) format. HTML is well known and is displayed in the Internet Explorer HTML player available from Microsoft Corporation of Redmond, Wash. The displayed contents of HTML page window 240 (FIG. 2) can be completely static and change only in response signals generated by a user using graphical user interface techniques. Alternatively, the displayed contents of HTML page window 240 can change in a manner which is synchronized with video and audio playback of motion video content 902 (FIG. 9) and audio content 904 of multimedia document 140. In the latter instance, the HTML content of multimedia document 140 displayed in HTML page window 240 (FIG. 2) is in the form of annotation stream 912 (FIG. 9) which is described more completely in U.S. patent application Ser. No. 08/819,585 by Edward Yan-bing Wang et al. entitled "Streaming and Displaying a Video Stream with Synchronized Annotations Over a Computer Network" filed Mar. 14, 1997 (hereinafter the '585 Application) and that description is incorporated herein by reference.

Creation of Temporal Annotations

During playback of motion video content 902, audio content 904, and annotation content 912, a user of client computer system 100A (FIG. 1B) can cause temporal display module 956 (FIG. 9) to note the relative time of the playback of temporally-dimensioned content of multimedia document 140 as represented in current relative time 960 and to create a temporal annotation which is associated with that relative time. For example, control buttons 220 (FIG. 2) include a temporal annotation control button 220M, actuation of which by the user is detected by user interface module 184 (FIG. 9). In response thereto, user interface module 184 (i) causes temporal display module 956 to suspend playback of temporally-dimensioned content such as motion video content 902 in video window 210 (FIG. 2) and of audio content 904 (FIG. 9) through loudspeaker 120B (FIG. 1), (ii) causes temporal display module 956 (FIG. 9) to note the relative time as represented in current relative time 960 and communicate the current relative time to temporal annotation manager 182, and (iii) sends a temporal annotation post request to temporal annotation manager 182. The temporal annotation post request includes (i) data which identifies multimedia document 140 as the multimedia document currently displayed by temporal display module 956 and to which currently relative time 960 corresponds, (ii) content data as authored by the user in the manner described more completely below, and (iii) current relative time 960. The temporal annotation post request can also include data identifying the user as the author of the content data and title data which is authored by the user in the manner described below and which provides a brief description of the substantive content authored by the user and represented by the content data. In response to the temporal annotation post request, temporal annotation manager 182 creates a new temporal annotation entry 300 (FIG. 3) which represents a new temporal annotation associated with current relative time 960 and which is described in greater detail below.

Alternatives to temporal annotation control button 220M (FIG. 2) as user interface mechanisms by which user interface module 184 (FIG. 9) allows the user to cause creation of temporal annotation entry 300 (FIG. 3) include pop-up menus and pull-down menus which include an option, selection of which by the user suspends playback, notes the relative time, and creates temporal annotation entry 300 in the manner described above. Pop-up and pull-down menus are well known and, as graphical user interfaces, are responsive to signals generated by physical manipulation of user input devices 130 (FIG. 1B) by the user. An example of a pop-up menu is given in more detail below.

Figures 3, 4:
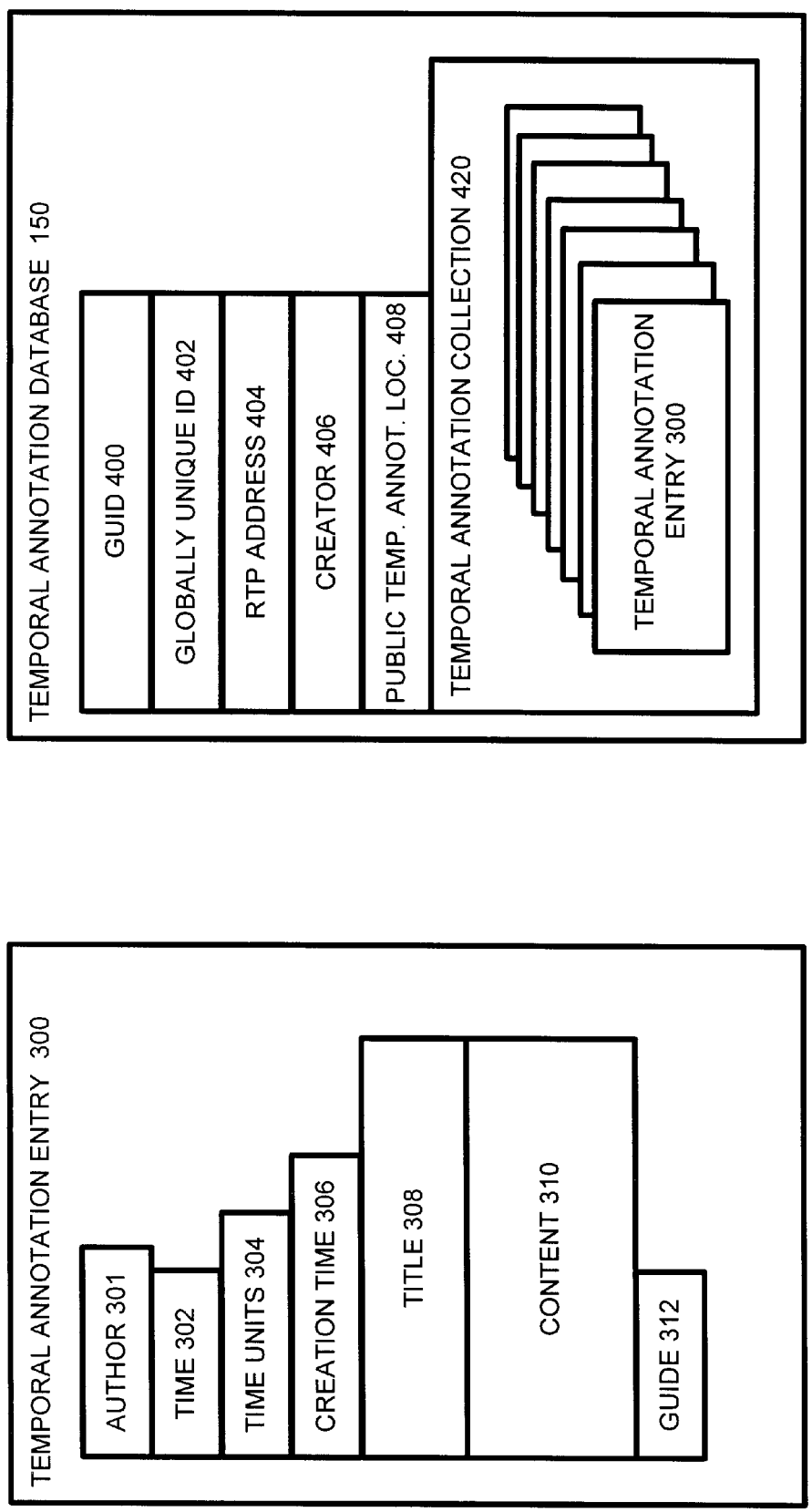
FIG. 3 is a block diagram of a temporal annotation entry which represents a temporal annotation in accordance with the present invention.
FIG. 4 is a block diagram of the temporal annotation database of FIGS. 1B–C which includes the temporal annotation entry of FIG. 3.

As described more completely below, temporal annotation entry 300 (FIG. 3) includes data representing a title of the temporal annotation and content created by the user for inclusion in multimedia document 140 (FIG. 1) as represented in display 200 (FIG. 2). As described more completely below, the data of the title and content can be, for example, simple text or hypertext markup language (HTML) which includes stylized text, graphics, motion video, audio, and/or hypertext links to other HTML documents. In addition, the title and user-authored content can be motion video and/or audio signals. The user can specify title and content data using any conventional text and/or HTML editing mechanisms by physical manipulation of user input devices 130 (FIG. 1B) or by speaking into a microphone 130A to create audio content or by providing video content to audio/video capture circuitry 130B. By using conventional editing mechanisms, the user is presented with a familiar interface for authoring content to be added to multimedia document 140 (FIG. 1C). In fact, the same interface by which the user would author content of multimedia document 140 itself can be used by the user to author content to be included in multimedia document 140 as a temporal annotation represented by temporal annotation entry 300 (FIG. 3).

Thus, the user can author content of temporal annotation entry 300 for inclusion in multimedia document 140 (FIG. 1C). Since temporal annotation entry 300 (FIG. 3) is stored in temporal annotation database 150 (FIG. 1C) and not as a component of multimedia document 140, the user can author such content for inclusion in multimedia document 140 even if the user has no write access to multimedia document 140. For example, the user cannot add to table of contents links 912 (FIG. 9) to thereby include in table of contents 230 (FIG. 2) temporal links to portions of the temporally-dimensioned content of multimedia document 140 which are interesting to the user unless the user has write access to multimedia document 140. As described above, multimedia document 140 can be, for example, an HTML document which includes text, graphics, motion video, and audio signals or can be a motion video file or an audio. The user might lack write access to multimedia document 140 if multimedia document 140 is stored in read-only memory such as a CD ROM or if multimedia document 140 is retrieved through computer network 170 (FIG. 1A) from a computer system to which the user does not have authority to write data. A significant disadvantage to granting the user write access to multimedia document 140 (FIG. 1C) is that such generally grants the user the ability to destroy content of multimedia document 140.

In addition, public temporal annotations, which are described below in greater detail, can be stored independently of other components of multimedia document 140 and can therefore authorize access to public temporal annotations regardless of the specific types of access authorized for other components of multimedia document 140. For example, general conventional access rights which control access to other computer resources, e.g., specific peripheral devices or data files stored in computer memory, can be used to control access by a user to public temporal annotations created by another user. Such access rights can identify specific users and/or groups of users and can authorize specific types of access for each user or group, namely, read, write, delete, and create access. Access rights for a public temporal annotation database 910 (FIG. 9), which is described more completely below, can be independent of, and differ from, access rights of multimedia document 140 and individual components thereof, e.g., table of contents links 914. Accordingly, corruption of multimedia document 140 or any components thereof can be prevented while permitting annotation of motion video content 902 by creation of public temporal annotations associated therewith. In one embodiment, a user is required to supply user identification and an associated password to be authorized to add a public temporal annotation entries to public temporal annotation database 910 of multimedia document 140.

Structure of Temporal Annotations

A temporal annotation is represented in memory 104 (FIG. 1B) by a temporal annotation entry 300 (FIG. 3) which includes a number of fields which in turn represent various characteristics of the temporal annotation. Specifically, in this illustrative embodiment, temporal annotation entry 300 includes an author field 301, a time field 302, a time units field 304, a creation time field 306, a title field 308, a content field 310, and an identifier field 312. Each of fields 301–312 is a collection of data which define a particular characteristic of temporal annotation entry 300. In an alternative embodiment which is described more completely below, temporal annotation entry 300 includes additional fields which identify multimedia document 140 (FIG. 9) as the multimedia document to which temporal annotation entry 300 (FIG. 3) is associated.

Author field 301 contains data identifying the user who creates temporal annotation entry 300 and who is therefore the author of the content stored in content field 310 as described more completely below. To this point, temporal annotation entry 300 and temporal annotation database 150 (FIG. 1C) are described as representing annotations created by a single user, namely, the user of client computer system 100A. However, it is anticipated, and is described more completely below, that playback of multimedia document 140 can include display of temporal annotations which are created by any of a number of users and which are retrieved from multiple temporal annotation databases stored on any constituent computer system of computer network 170. Accordingly, temporal annotation database 150 can include temporal annotation entries created by any of a number of users and can be stored within any constituent computer system of computer network 170 such as client computer system 100A as shown. Therefore, temporal annotation entry 300 (FIG. 3) includes author field 301 to identify the author of content which is stored in content field 310 as described more completely below.

Time field 302 contains data representing the relative time of the motion video, audio, and annotation content of multimedia document 140 (FIG. 1C) with which temporal annotation entry 300 (FIG. 3) is associated. Time units field 304 contains data representing the units of time of the time represented in time field 302. Together, time field 302 and time units 304 unequivocally specify the relative time of the temporal annotation represented by temporal annotation, entry 300. The relative time can be specified as a specific point in time or as a range of time with which the temporal annotation of temporal annotation entry 300 is associated.

Creation time field 308 contains data specifying the date and time at which temporal annotation entry 300 is created. It should be noted that the time of creation of temporal annotation entry 300 is absolute and is not relative to the video or audio content of multimedia document 140 (FIG. 1C). Accordingly, a user can specify that temporal annotations which are particularly old, e.g., created more than two weeks earlier, are not to be displayed with the content of multimedia document 140.

Title field 308 (FIG. 3) contains data representing a title by which the temporal annotation represented by temporal annotation entry 300 is identified. The title is generally determined by the user and the user enters the data representing the title using conventional and well known user interface techniques. In one embodiment, the user enters the data representing the title by pressing keys on a conventional keyboard of user input devices 130 (FIG. 1B). The data can be as simple as ASCII text or as complex as HTML code which can include text having different fonts and type styles, graphics including wallpaper, motion video images, audio, and links to other multimedia documents. While simple titles are typically preferred by users of multimedia document players, the flexibility of HTML code allows each user to determine exactly how complex the title of the temporal annotation should be.

Content field 310 (FIG. 3) contains data representing the substantive content of the temporal annotation as authored by the user. The user enters the data representing the content using conventional and well known user interface techniques. As described above with respect to title field 308, the data representing the content in content field 310 can be as simple as ASCII text or as complex as HTML code. In an embodiment in which content field 310 contains HTML code, the content added by the user in creating temporal annotation entry 300 can include text, graphics, motion video and/or audio, or links to text, graphics, motion video and/or audio, which is relevant to the content of multimedia document 140 (FIG. 1C) at the relative time represented by time field 302 (FIG. 3) together with time units field 304. In addition, content field 310 can store motion video signals and/or audio signals in any of a number of conventional forms other than HTML code. Thus, in essence, content field 310 contains data representing the substantive content the user wishes to include with the presentation of multimedia document 140 (FIG. 1C) at the relative time represented by time field 302 (FIG. 3) and time units field 304.

Figure 10:
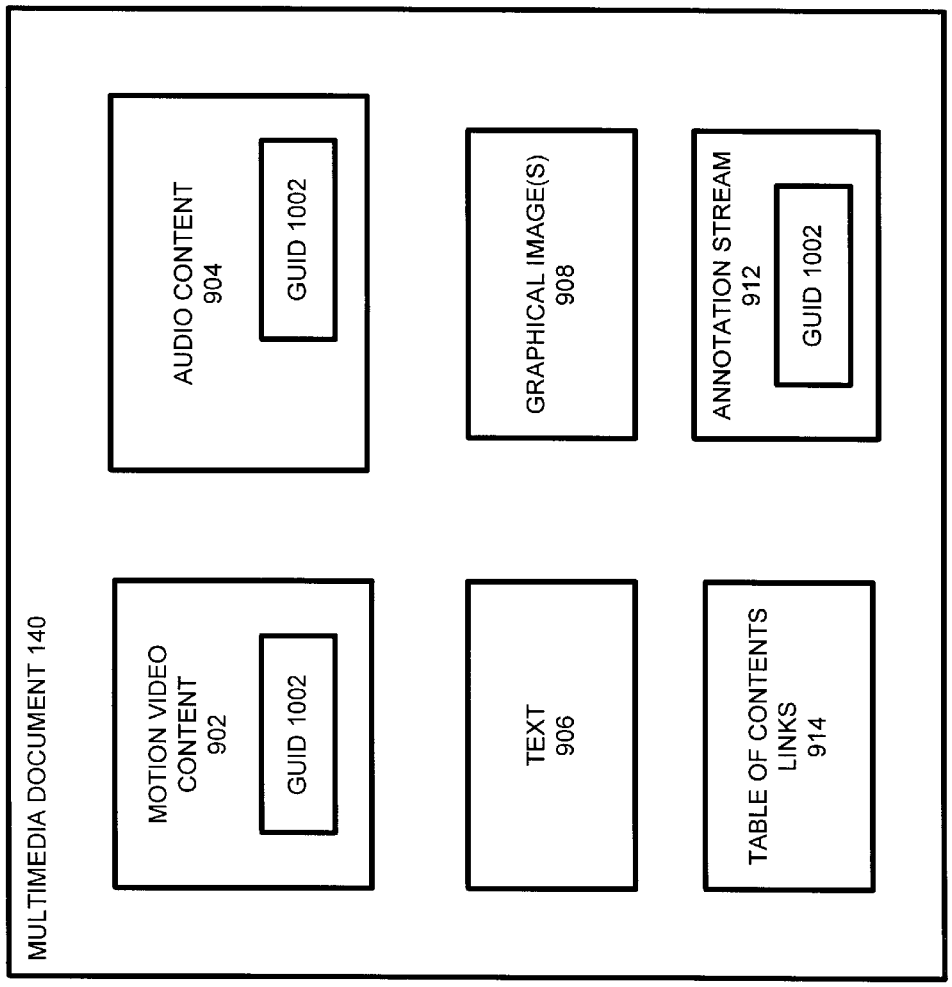
FIG. 10 is a block diagram of the multimedia document of FIGS. 1C and 9 in greater detail, showing the inclusion of GUIDs in various components of the multimedia document.

Identifier field 312 stores data which uniquely identifies temporal annotation entry 300 in the same manner GUID 1002 (FIG. 10) uniquely identifies multimedia document 140 as described more completely below. Identifier field 312 (FIG. 3) can be used by other temporal annotation entries to associate such other temporal annotation entries with annotation entry 300. In this way, temporal annotation entry 300 can be annotated in the manner multimedia document 140 (FIG. 9) is annotated as described herein. By enabling annotation of temporal annotations, threads of discussion can develop in which a second temporal annotation responds to a first temporal annotation, a third temporal annotation responds to the second temporal annotation and so on. Such recursive annotation provides an environment which facilitates collaboration and fruitful discussion which has heretofore not been realized in multimedia.

The user can create multiple temporal annotation entries and all such entries for a particular multimedia document, e.g., multimedia document 140 (FIG. 1C), are stored in client computer system 100A in a temporal annotation database 150 (FIGS. 1C and 4). As noted above, temporal annotation database 150 can also include temporal annotation entries created by other users. In this illustrative embodiment, temporal annotation database 150 stored temporal annotations which are personal to the user of client computer system 100A and is therefore stored locally, i.e., within client computer system 100A.

Multiple temporal annotation entries, e.g., temporal annotation entries 420 (FIG. 4), are stored in a temporal annotation database 150. Temporal annotation manager 182 (FIG. 9) adds, deletes, and modifies temporal annotation entries in temporal annotation database 150 dynamically. Such is a significant departure from annotations which are authored as an original part of a multimedia document. For example, annotation stream 912 of multimedia document 150 is generally created once as an integral part of multimedia document 150 and remains a fixed component thereof. In contrast, temporal annotation entries can be created and added to temporal annotation database 150 any time a user views multimedia document 150 and cares to comment upon the content of multimedia document 150 in the form of a temporal annotation. Therefore, temporal annotation manager 182 forms temporal annotation entry 300 (FIG. 3) from identification data, content data, title data, and author data of a temporal annotation post request received from user interface module 184 (FIG. 9) as described above and adds temporal annotation entry 300 to temporal annotation database 150 even if temporal annotation database is previously created and already includes other temporal annotation entries.

Temporal annotation database 150 includes a temporal annotation collection 420 (FIG. 4) of temporal annotation entries which in turn include temporal annotation entry 300.

In addition, temporal annotation database 150 includes a number of fields 400–408 which specify common characteristics of all temporal annotation entries of temporal annotation collection 420. In an alternative embodiment, fields 400–408 are included in temporal annotation entry 300 and other temporal annotation entries include separate, redundant instances of fields 400–408. Temporal annotation database 150 includes an annotation identifier field 400, an identifier field 402, an RTP address field 404, a creator field 406, and a public temporal annotation location field 410.

Annotation identifier field 400 contains data which uniquely identifies temporal annotation database 150 within constituent computer systems of computer network 170 (FIG. 1A). Identifier field 402 contains data which uniquely identifies multimedia document 140 (FIG. 1C) within constituent computer systems of computer network 170 as the multimedia document to which temporal annotation entries of temporal annotation collection 420 (FIG. 4) pertain. Thus, data stored in identifier field 402 associates temporal annotations of temporal annotation collection 420 with multimedia document 140 (FIG. 9) such that multimedia document player 110 can incorporate and synchronize substantive content of temporal annotations of temporal annotation collection 420 (FIG. 4) with substantive content of multimedia document 140 (FIG. 9). Such incorporation and synchronization allows a user to effectively add content to the presentation of multimedia document 140 notwithstanding the user's lack of write access to multimedia document 140 itself. Accordingly, components of multimedia document 140, e.g., motion video content 902, audio content 904, text 906, graphical images 908, annotation stream 912, and table of contents 914, are protected from inadvertent or intentional corruption or destruction by the, user, yet the user can augment and annotate the substantive content of the presentation of multimedia document 140.

The data stored in identifier field 402 (FIG. 4) can identify multimedia document in a number of ways. For example, the data can represent a realtime transport protocol (RTP) address or a globally unique identifier (GUID) of multimedia document 140 (FIG. 9). An RTP address, e.g., "rtp://www.vxtreme.com/video/lecture1.vlo," is a type of universal resource locator (URL) by which multimedia documents are identified within a computer network. RTP addresses have the advantage that each multimedia document, e.g., multimedia document 140 (FIG. 1), and its components each currently have RTP addresses and each RTP address is unique within a particular computer network. However, using RTP addresses to associate temporal annotations with multimedia document 140 has a number of disadvantages.

First, the components of a multimedia document, e.g., the motion video, audio, and annotations, can each have a separate, respective RTP address. Such is often true since components of multimedia document 140 can be stored independently of multimedia document 140. For example, in an embodiment in which multimedia document 140 is an HTML document, multimedia document incorporates motion video content 902 be including an HTML tag which references motion video content 902. Accordingly, motion video content 902 can be stored independently of multimedia document 140. Other components, such as text 906 and table of contents links 914, can be directly included in multimedia document 140. Each component of multimedia document 140 which is stored independently of multimedia document 140 has an RTP/HTTP address which is different from the RTP address of multimedia document 140 and from all other RTP addresses within computer network 170. Since RTP addresses specify a particular location within computer network 170 of various resources, all RTP addresses are necessarily unique within computer network 170. For example, motion video content 902 can have an RTP address of "rtp://www.vxtreme.com/video/lecture1.vlo," and audio content 904 can have an RTP address of "rtp://www.vxtreme.com/video/lecture1.sph." At the same time, temporal annotation database 150 is associated with all of multimedia document 140, including motion video content 902, audio content 904, and graphical images 908, each of which has a separate RTP address. Therefore, it can be difficult to select one of these RTP addresses as the specific RTP address by which temporal annotation database 150 is associated with multimedia document 140.

In addition, multimedia document 140 can include different components depending on the particular characteristics of computer system 100. Specifically, multimedia can include logic for selecting components according to particular characteristics of the user requesting multimedia document 140. For example, multimedia document 140 can include a high-resolution motion video image (e.g., 320 by 240 pixels) if computer system 100 has a high-bandwidth connection to computer network 170 such as an ISDN connection which can support data transfer rates of 128 kb/s or more. Alternatively, multimedia document 140 can include a low-resolution motion video image (e.g., 160 by 120 pixels) if computer system 100 has a low-bandwidth connection to computer network 170 such as a modem connection which supports only 28.8 kb/s data transfer. Each motion video file can have a different RTP address. Which motion video file is included in multimedia document 140 can change depending on the particular computer system used to retrieve multimedia document 140, e.g., can change if the user of computer system 100 changes network access circuitry 160.

Furthermore, human administrators of server computer systems 100B–D (FIG. 1A) can decide to move multimedia document 140 (FIG. 1C) from server computer system 100B to a different computer system, e.g., server computer system 100C (FIG. 1A), to more efficiently serve client computer systems, such as client computer system 100A, which retrieve multimedia document 140 (FIG. 1C). In moving multimedia document 140, the RTP address of multimedia document 140 is changed. In addition, if multimedia document 140 is stored locally in memory 104 (FIG. 1B) of client computer system 100A, multimedia document 140 (FIG. 1C) can be moved within memory 104 (FIG. 1B) by the user for logical organization of the contents of memory 104, thereby changing the RTP address of multimedia document 140. Similarly, one or more components of multimedia document 140 can be moved, either within computer network 170 or within memory 104, and have their RTP addresses changed as well. Thus, while it is feasible to use RTP addresses for unique identification of multimedia document 140, such can become unworkable with changes to multimedia document 140 or the place at which multimedia document 140 or its components are stored within a particular computer system or within computer network 170.

In one embodiment, the RTP address of multimedia document 140 itself, e.g., "rtp://www.vxtreme.com/video/lecture1.html," is stored in identifier field 402 (FIG. 4) to associate temporal annotation database 150 with multimedia document 140. In an alternative embodiment, a globally unique identifier (GUID) 1002 (FIG. 10) is assigned to multimedia document 140 and is used to associate multimedia document 150 with multimedia document 140 by storing GUID 1002 in identifier field 402 (FIG. 4). In another alternative embodiment, a uniform resource name (URN) such as those described by K. Sollins and L. Mosinter in "Functional Requirements for Uniform Resource Names," *IETF RFC* 1733 (December 1994) is stored in identifier field 402 (FIG. 4) to associate temporal annotation database 150 with multimedia document 140.

GUID 1002 is unique among all other GIUDs within constituent computer systems of computer network 170 (FIG. 1A). However, the same GUID, e.g., GUID 1002 (FIG. 10), identifies all components of multimedia document 140 in addition to multimedia document 140 itself Specifically, GUID 1002 is included in motion video content 902, audio content 904, graphical images 908, and annotation stream 912. Such is possible since GUID 1002 does not serve any alternative purpose, such as specifying the location within computer network 170 of multimedia document 140 and any components thereof. Accordingly, multimedia document 140, motion video content 902, audio content 904, graphical images 908, and annotation stream 912 can be stored independently and moved about computer network 170 and still share the same GUID 1002.

While all multimedia content currently available through the Internet currently has a URL (such as an RTP address) by which the multimedia content can be identified, use of GUID 1002 (FIG. 10) to identify multimedia document and to identify components of multimedia document 140 as such would require addition of GUIDs such as GUID 1002 retroactively to some of the multimedia content already in existence. Such retroactive inclusion of GUIDs can be accomplished in either of two ways. Various standard data formats for multimedia content have been promulgated, and multimedia content currently available on the Internet are stored in such standard data formats. Some of such standard data formats include fields which are unused. Data representing a GUID are stored in an unused field if the standard format defines an unused field. Otherwise, if the standard format does not include an unused field, a new format is developed which includes generally the established standard format and an additional field for storage of data representing a GUID.

A GUID identifies a single piece of work, which is defined herein as a single presentation of information. In the context of multimedia documents, a GUID identifies all components of the multimedia document which are presented to a viewing user contemporaneously for a single audio/visual presentation. Various components of multimedia document 140 can be stored independently from one another in various constituent computer systems of computer network 170. Accordingly, identification of the components of multimedia document can be somewhat difficult. If multimedia document 140 is an HTML document, multimedia document 140 typically includes references to all components of multimedia document 140 in the form of HTML tags referring to those components. However, multimedia document 140 can also include HTML tags to items which are not considered components of multimedia document 140. Therefore, some criteria are needed to identify components of the same presentation of multimedia document 140. In one embodiment, a human user can make such a determination and cause such components to include the same GUID 1002. In an alternative embodiment, temporal display module 956 (FIG. 9) determines which items referenced by multimedia document 140 are synchronized with one another, i.e., depend upon a common relative time line. Temporal display module 956 determines that all such items referenced by multimedia document 140 are part of the same presentation of multimedia document 140 and causes such components to include the same GUID 1002.

GUIDs can be generated in any of a number of manners. In one illustrative embodiment, GUID 1002 for multimedia document 140 is generated at the capturing of a motion video content 902 and is derived from data representing the particular computer system which captures the motion video image and the particular time of the capture. In general, motion video images provide a contextual foundation for the remainder of a multimedia document. For example, audio content 904 of multimedia document 140 accompanies motion video content 902 of multimedia document 140 as displayed in video window 210 (FIG. 2) to provide an audio/visual presentation. In addition, entries of table of contents 230 are associated with particular relative times of the same motion video content and annotations represented in HTML page window 240 are synchronized with playback of the same motion video content 902 (FIG. 10) of multimedia document 140. Thus, capture of motion video content, i.e., transformation from an analog form on video tape, for example, to a digital format suitable for storage in memory 104 (FIG. 1B) of client computer system 100A, represents a beginning of the creation of the overall presentation of multimedia document 140 (FIG. 1C).

Figure 11:
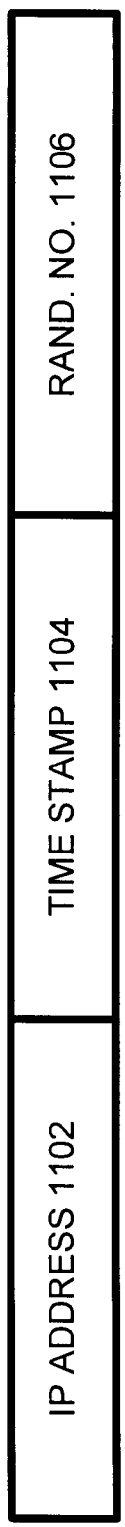
FIG. 11 is a block diagram of the GUID of FIG. 10 in greater detail.

GUID 1002 is shown in greater detail in FIG. 11 and is, in this illustrative embodiment, a concatenation of an IP address 1102, a time stamp 1104, and a random number 1106. Client computer system 100A (FIG. 1C) has a unique identifier within computer network 170 such as an Internet Protocol (IP) address. In addition, since generally only one motion video image can be captured by client computer system 100A at one time, the date and time at which motion video content of multimedia document 140 is captured is typically unique among all captured motion video images of client computer system 100A. Accordingly, the combination of IP address 1102 (FIG. 11) of client computer system 100A (FIG. 1C) and the date and time at which motion video content 902 (FIG. 10) of multimedia document 140 is captured as represented by time stamp 1104 (FIG. 11) distinguishes similarly created GUIDs of all motion video content stored in constituent computer systems of computer network 170 (FIG. 1A). In one embodiment, a random number is generated and stored as random number 1106 (FIG. 11) to further ensure that GUID 1002 is unique.

It should be noted that, in this illustrative embodiment, GUID 1002 is formed at the capturing of motion video content. Any motion video content derived from the originally captured content has the same GUID, e.g., GUID 1002, of the originally captured motion video content. For example, if the originally captured motion video content is processed to create a derivative motion video which has a different lateral dimension (e.g., down to 160 by 120 pixels from an original dimension of 320 by 240 pixels) and/or a different frame rate, any such derivative motion video has the same GUID as the original motion video. Therefore, substitution of such derivative motion video for the originally-captured motion video does not defeat the association between the motion video content and associated temporal annotations.

Thus, identifier field 402 (FIG. 4) of temporal annotation database 150 contains data uniquely identifying multimedia document 140 (FIG. 1), namely, a GUID and/or an RTP address. In addition, temporal annotation database 150 (FIG. 4) includes an RTP address field 404. RTP address field 404 contains data representing the RTP address of multimedia document 140 (FIG. 1) to provide an alternative mechanism for associating multimedia document 140 with temporal annotation database 150 (FIG. 4). Creator field 406 of temporal annotation database 150 contains data identifying the user who created temporal annotation database 150. Public temporal annotation location field 410 of temporal annotation database 150 contains data indicating a location within computer network 170 at which public temporal annotations are stored. Public temporal annotations are described more completely below.

Locating Temporal Annotation Database 150 from Multimedia Document 140

Multimedia document player 110 (FIG. 1C) retrieves multimedia document 140 for display to the user by requesting multimedia document 140 from temporal annotation manager 182. In response thereto, temporal annotation manager 182 retrieves multimedia document parts 140A and 140B of multimedia document 140 from web server 186 and video/audio server 188, respectively. Web server 186 and video/audio server 188 are conventional. When temporal annotation manager 182 retrieves multimedia document parts 140A–B, temporal annotation manager 182 also retrieves the temporal annotation database associated with multimedia document 140, e.g., temporal annotation database 150. In one embodiment, temporal annotation database 150 is stored in a location known to temporal annotation manager 182 with a file name derived from a unique identifier of multimedia document 140. As described above, the unique identifier can be based on an RTP address or a GUID. The location is a specific directory within memory 104 (FIG. 1B) as represented by data stored within temporal annotation manager 182. In one embodiment, the specific directory is a directory in which multimedia document player 110 caches data files which have recently been retrieved through computer network 170.

In this illustrative embodiment, all temporal annotation databases for all respective multimedia documents are stored in the specific directory. Each temporal annotation database has a unique file name within the specific directory. As described above, the file name for each temporal annotation database, e.g., temporal annotation database 150, is derived from the unique identifier of multimedia document 140. For example, a hashing function is applied to the unique identifier of multimedia document 140 to derive the file name of temporal annotation database 150. Accordingly, temporal annotation manager 182 can locate temporal annotation database 150 from the unique identifier of multimedia document 140 by applying the same hashing function to produce a file name and searching for the produced file name in the specific directory. Temporal annotation manager 182 can verify that the appropriate temporal annotation database by comparing data stored in unique identifier field 402 (FIG. 4) with the unique identifier of multimedia document 140 (FIG. 9).

In an alternative embodiment, temporal annotation manager 182 maintains a table which associates temporal annotation database file names with respective unique identifiers of multimedia documents annotated by each temporal annotation database. In another alternative embodiment, multimedia document 140 can include data which specifies a location within the constituent computer systems of computer network 170 at which temporal annotation database 150 is stored. Multimedia document 140 can include such data in the form of an embedded HTML tag, for example.

The association of public temporal annotations with multimedia document 140 by temporal annotation manager 182 is described below in the context of public temporal annotations.

Use of Temporal Annotations to Locate Associated Content Within a Multimedia Document There is a multitude of ways in which the user-authored content of a temporal annotation can be included in a presentation of multimedia document 140. For example, the user-authored content can automatically be displayed as the relative time of each temporal annotation is reached during playback of temporally-dimensioned content of multimedia document 140. One embodiment of such automatic display of user-authored content is described more completely below. In addition, temporal annotations can be used as temporal links by which a user can quickly start playback of temporally-dimensioned content of multimedia document 140 at the relative time of a particular temporal annotation to immediately view the temporal context of the temporal annotation within multimedia document 140. Accordingly, temporal annotations can be used in the manner described above with respect to table of contents 230 (FIG. 2) to enable a user to select a relative time within the temporally-dimensioned display of multimedia document 140 (FIG. 1C) for immediate display. However, as described more completely above, additions to table of contents 230 (FIG. 2) requires write access to table of contents links 914 (FIG. 9) of multimedia document 140 and therefore to multimedia document 140 itself.

Figure 6:
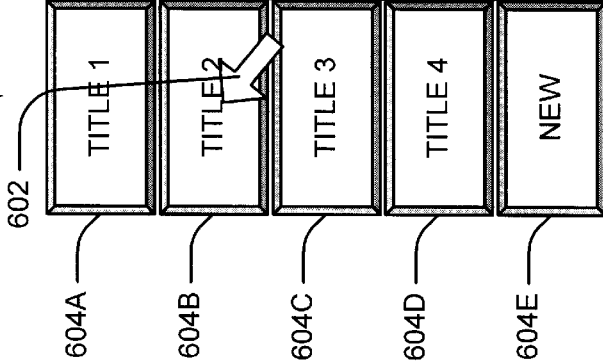
FIG. 6 is a screen view of a pop-up menu by which a user selects a temporal annotation in accordance with the present invention.
Figure 6:
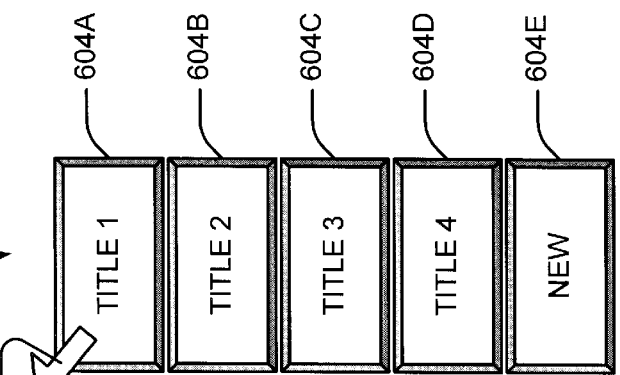

Since temporal annotation entry 300 (FIG. 3) includes a relative time in motion video content 902 (FIG. 9), and all temporally-dimensioned content, of multimedia document 140 as stored in time field 302 (FIG. 3) and time units field 304, temporal annotation entry 300 specifies a relative time within motion video content 902 (FIG. 9) of multimedia document 140 to which playback can jump. In one illustrative embodiment, the user indicates a desire to jump to a relative time within the motion video content displayed in video window 210 (FIG. 2) by actuating temporal annotation control button 220M. In response thereto, multimedia document player 110 (FIG. 1B) creates and displays in display screen 122 a pop-up menu 604 (FIG. 6). Pop-up menu 604 includes a number of options 604A–E in which option 604E is selected by the user to create a new temporal annotation entry in the manner described above. Options 604A–D, however, each represent a previously created temporal annotation entry stored in temporal annotation collection 420 (FIG. 4) of temporal annotation database 150.

Figure 7:
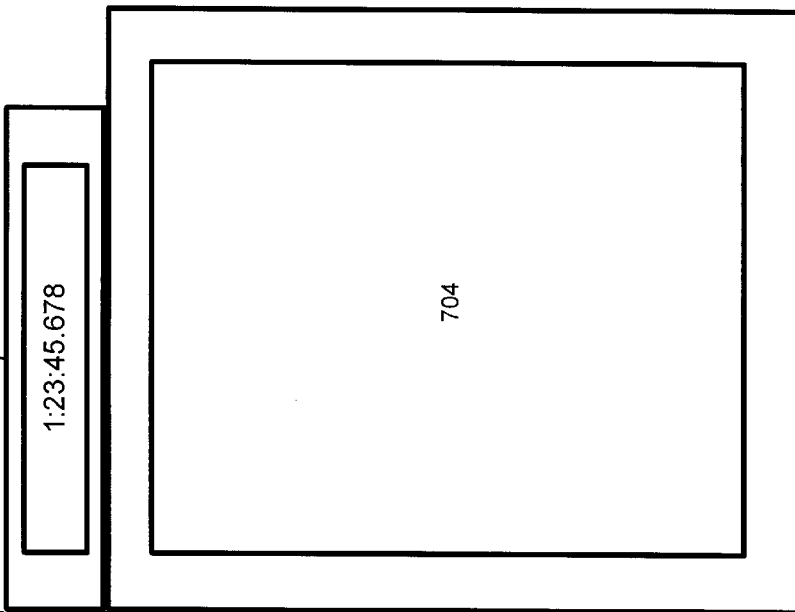
FIG. 7 is a screen view of a pop-up menu and displayed option thereof by which a user selects a temporal annotation in accordance with the present invention.

The representation of each of options 604A–D within display screen 122 is a graphical representation of the substance of the title as contained in title field 306 (FIG. 3) of the temporal annotation entry representing the corresponding temporal annotation. Accordingly, each temporal annotation is identified in a manner determined by the user who created the temporal annotation. Any of options 604A–E (FIG. 6) of pop-up menu 604 can be actuated in a well-known manner by movement of a cursor 602 over the representation of the option and actuation of a user input device in the manner described more completely below with respect to GUI buttons. As shown in FIG. 7, by placing cursor 602 over option 604B for a predetermined period of time, the user causes further information regarding the temporal annotation associated with option 604B. For example, multimedia document player 110 (FIG. 1B) detects the presence of cursor 602 (FIG. 6) over option 604B for at least the predetermined amount of time and retrieves from temporal annotation 150 (FIG. 14) the one of temporal annotation entries 420 which represents the temporal annotation corresponding to option 604B (FIG. 6). In one embodiment, the predetermined amount of time is one second.

The temporal annotation corresponding to option 604B is the temporal annotation entry of temporal annotation collection 420 (FIG. 4) whose title field is represented as option 604B. In this illustrative example, temporal annotation entry

300 (FIG. 3) represents the temporal annotation corresponding to option 604B (FIG. 7). Multimedia document player 110 (FIG. 1B) displays adjacent to option 604B (FIG. 7) a time window 702 in which the relative time represented by time field 302 (FIG. 3) and time units field 304. In addition, multimedia document player 110 (FIG. 1B) displays a window 704 (FIG. 7) adjacent to time window 702 and displays in window 704 the user-authored content represented in content field 310 (FIG. 3). Thus, by positioning cursor 602 (FIG. 7) over option 604B for at least the predetermined period of time, the user obtains further information pertaining to the temporal annotation corresponding to option 604B. Such further information includes whatever content the user creating temporal annotation entry 300 (FIG. 3) stores in content field 310.

If the user selects option 604B (FIG. 7), multimedia document player 110 (FIG. 9) detects the selection using conventional user interface techniques and retrieves a relative time as represented by data contained in time field 302 (FIG. 3) and time units field 304. Multimedia document player 110 (FIG. 9) causes temporal display module 956 to set current relative time 960 to the retrieved relative time and to commence playback of temporally-dimensioned content of multimedia document 140 in accordance with the newly set current relative time 960. For example, in jumping to the retrieved relative time in the playback of motion video content 902, temporal display module 956 selects from motion video content 902 a frame whose relative time within the motion video content is near the retrieved relative time and displays the selected frame in video window 210 (FIG. 2) and proceeds to display the sequence of frames subsequent to the selected frame such that playback of motion video content 902 (FIG. 9) proceeds from the selected frame. As a result, each temporal annotation provides a mechanism by which the user can pinpoint a particular point in the temporally-dimensioned content of a multimedia document and later immediately view the temporally-dimensioned content at that particular point.

In general, a user is likely to create a temporal annotation pertaining to specific content of multimedia document 140 shortly after the specific content is played by multimedia document player 110. Accordingly, the context of a temporal annotation is likely to precede the relative time with which the temporal annotation is associated, albeit with relatively close proximity. Therefore, in one embodiment, temporal display module 956 commences playback of the temporally-dimensioned content of multimedia document 140 slightly before the relative time represented in fields 302–304 of the selected temporal annotation in response to user selection of a temporal annotation in the manner described above. The amount of time by which temporal display module 956 leads the retrieved relative time can be predetermined, i.e., five seconds. Alternatively, the amount of time by which temporal display module 956 leads the retrieved relative time can be determined by the substantive content of multimedia document 140. For example, temporal display module 956 can search temporally-dimensioned content of multimedia document 140 for a significant event which most nearly precedes the retrieved relative time and can commence playback of multimedia document 140 at that significant event. Significant events can be indicated, for example, (i) by table of content links 914, (ii) by independently encoded frames of motion video content 902, which are generally referred to as I-frames and which can indicate a change of scene in motion video content 902, (iii) by brief periods of relative silence in audio content 904, (iv) by event time markers in annotation stream 912, (v) or any combination thereof. In addition, temporal display module 956 can use speech recognition techniques to determine the relative time at which each spoken sentence begins and note those relative times as significant events.

Display of Temporal Annotation Content During Multimedia Playback

As described briefly above, the user-authored content of temporal annotations can automatically be displayed as the relative time of each temporal annotation is reached during playback of temporally-dimensioned content of multimedia document 140. The following example is illustrative.

Consider that the user views display 200 (FIG. 2) of multimedia document 140 (FIG. 1C) and notices a noteworthy gesture of an instructor shown in video window 210 (FIG. 2) at a relative time of one minute and thirty seconds from the beginning of the motion video image displayed in video window 210. At that time, the user creates temporal annotation entry 300 (FIG. 3) in the manner described above such that time field 302 and time units field 304 collectively indicate a relative time of one minute and thirty seconds from the time of the first frame of the motion video image displayed in video window 210 (FIG. 2). In addition, the user enters data briefly describing the nature of the gesture for storage in title field 308 (FIG. 3) and data representing a more detailed description of the gesture and its significance for storage in content field 310. The more detailed description can include a textual, audio, or audio/visual description of the gesture and its significance, an enlarged still graphical image of the gesture, and one or more links to multimedia documents which are stored in constituent computer systems of computer network 170 (FIG. 1A) and which provide additional information regarding body language and non-verbal communication.

In the manner described above, temporal annotation entry 300 (FIG. 3) can be used by the user to immediately display the portion of the motion video and audio content at which the gesture is made to quickly view the gesture. In addition, the user can cause multimedia document player 110 (FIG. 1C) to re-display multimedia document 140, to thereby commence playback of the temporally-dimensioned content of multimedia document 140 from the beginning, by actuating one of control buttons 220 (FIG. 2) indicating a "play" command. When display of the motion video and audio content of multimedia document 140 (FIG. 9) by multimedia document player 110 reaches the relative time represented in time field 302 (FIG. 3) and time units field 304, e.g., at one minute and thirty seconds into the playback of the motion video image displayed in video window 210 (FIG. 2), multimedia document player 110 (FIG. 9) displays the user-authored content represented in content field 310 (FIG. 3) of temporal annotation entry 300. In one embodiment, the user-authored content is displayed in a separate window of display screen 122 (FIG. 2). Thus, the user-authored content stored in content field 310 (FIG. 3) becomes part of the displayed content of multimedia document 140 (FIG. 9) and is displayed at the relative time at which corresponding content of multimedia document 140 is displayed to provide a temporal context for the user-authored content.

Figure 8:
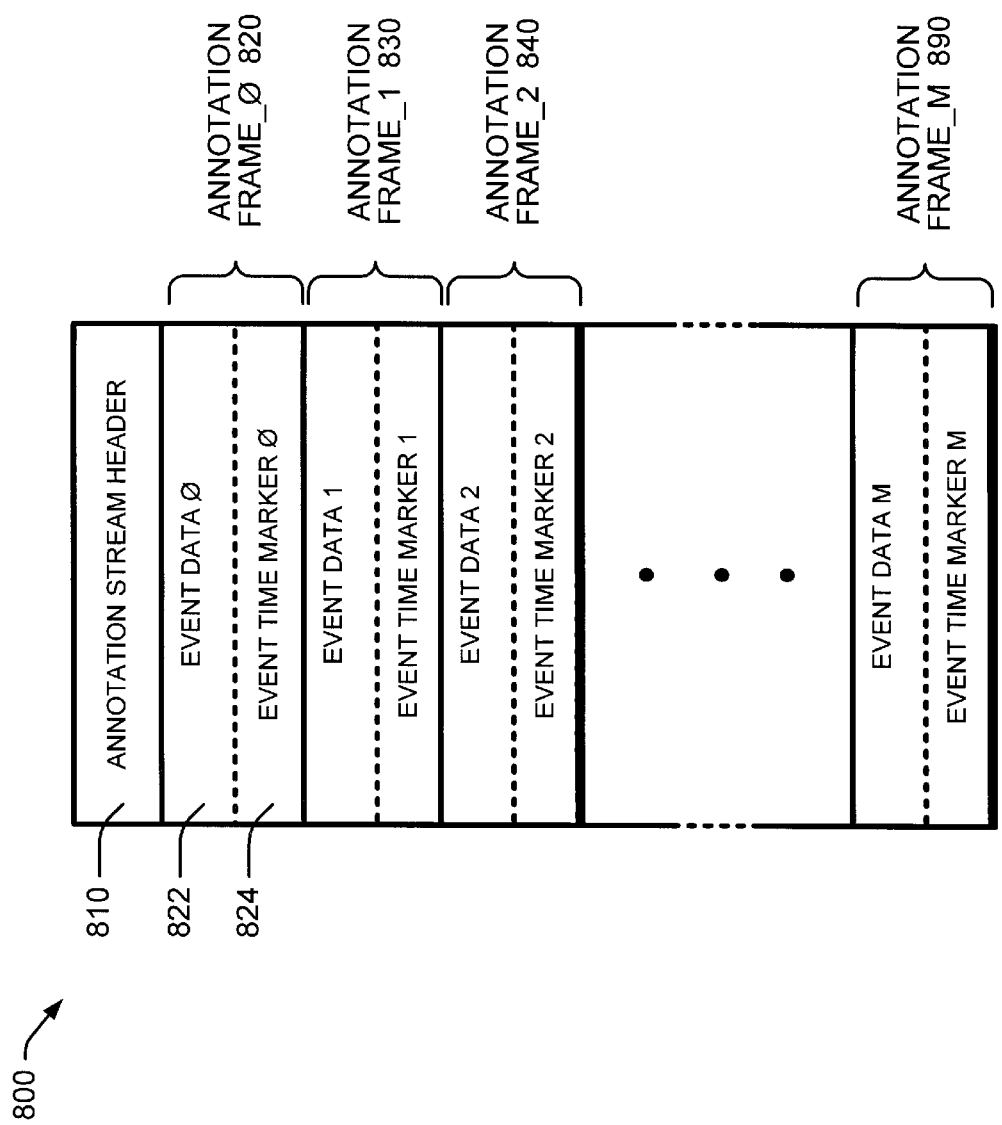
FIG. 8 is a block diagram of an annotation stream by which temporal annotations can be included in a playback of temporally-dimensioned content of the multimedia document of FIG. 1C in proper temporal context.

The '585 Application describes a stream of annotations which include data and a time marker and further describes display of such annotations synchronized with the display of temporally-dimensioned content, e.g., motion video content, and that description is incorporated herein by reference. After creation of a temporal annotation entry such as temporal annotation entry 300 (FIG. 3), a temporal annotation stream converter 952 (FIG. 9) of multimedia document player 110 adds to temporal annotation stream 800 (FIGS. 9 and 8) an annotation for the newly created temporal annotation entry. Accordingly, temporal annotation stream 800 includes an annotation for each temporal annotation entry of temporal annotation collection 420 (FIG. 4) of temporal annotation database 150. For example, annotation frame 820 (FIG. 8) represents temporal annotation entry 300 (FIG. 3) and includes event data 822 (FIG. 8) and an event time marker 824. Event data 822 is derived from data contained in content field 308 (FIG. 3), and event time marker 824 (FIG. 8) is derived from data contained in time field 302 (FIG. 3) and time units field 304. In one embodiment, temporal annotation stream converter 952 adds a new annotation to temporal annotation stream 800 by replacing and superseding temporal annotation stream 800 with a new temporal annotation stream which includes an annotation for each and every temporal annotation entry of temporal annotation collection 420 (FIG. 4) of temporal annotation database 150.

Temporal annotation stream 800 (FIG. 9) is included in multimedia document 140 by temporal display module 956 of multimedia document player 110, and display output module 958 of multimedia document player 110 displays temporal annotation stream 800 in the manner described more completely in the '585 Application, which description is incorporated herein by reference. As a result, user-authored content which is represented in temporal annotation entries of temporal annotation collection 420 (FIG. 4) and which is associated with temporally-dimensioned content of multimedia document 140 (FIG. 9) becomes part of the display of multimedia document 140 by multimedia document player 110.

Public Temporal Annotations

Public temporal annotations are similar to private temporal annotations which are described above except that public temporal annotations are viewable to multiple users of computer network who retrieve and display multimedia document 140 and thus become part of the content of multimedia document 140. General conventional access rights which control access to other computer resources, e.g., computer memory or specific peripheral devices, can be used to control access to public temporal annotations. Such access rights can identify specific users and/or groups of users and can authorize specific types of access for each user or group, namely, read, write, delete, and create access.

While a single temporal annotation database 150 is described above, multiple temporal annotation databases can be accessible to the user in the manner described above. In general, temporal annotation database 150 is private in that only a single user is granted write access to temporal annotation database 150. In addition, in this illustrative embodiment, temporal annotation database 150 is stored locally within memory 104 (FIG. 1B) of client computer system 100A which the user uses directly. However, in other respects, the above description of temporal annotation database 150 is directly applicable to public temporal annotation databases 910 (FIG. 9) which can be stored within any constituent computer system of computer network 170 (FIG. 1A) and which can contain temporal annotation entries authored by multiple users.

Using conventional user interface techniques, the user can cause multimedia document player 110 (FIG. 9) to have multiple temporal annotation databases open, i.e., to maintain access to multiple temporal annotation databases simultaneously. The manner in which a computer process can have multiple databases open simultaneously is conventional and well known. Temporal annotation manager 182 includes and synchronizes display of the substantive content of temporal annotation entries 920 of public temporal annotation databases 910 with playback of multimedia document 140 by temporal display module 956 in the manner described above with respect to temporal annotation database 150.

In this way, temporal annotations created by various users and stored in public temporal annotation databases 910 are incorporated into the multimedia display of multimedia document 140. To do so, the user of client computer system 100A (FIG. 1B) within which multimedia document player 110 executes generally must have read access to each of public temporal annotation databases 910. It should be noted that write access is not required. Accordingly, a group of users can limit write access such that only group members can add temporal annotations to a particular public temporal annotation database and yet make those temporal annotations viewable by all by granting all other users read access to the public temporal annotation database. For example, various organizations can comment upon published documents using temporal annotations and can keep temporal annotations of each organization separate from temporal annotations of other organizations. A user can select temporal annotations of specific organizations by opening the public temporal annotation database of each of the specific organizations and including those public temporal annotation databases in public temporal annotation databases 910.

User interface module 184 presents the user with user interface mechanisms by which the user can manage temporal annotation database 150 and public temporal annotation databases 910. The user interface itself is conventional. The user can open a temporal annotation database to thereby include display of the temporal annotations of the temporal annotation database in the display of multimedia document 140. Specifically, user interface module 184 receives from user input devices 130 (FIG. 1B) signals generated by the user indicating that a particular temporal annotation database is to be opened. In response thereto, temporal annotation manager 182 (FIG. 9) opens the specified temporal annotation database. In addition, the user can cause multimedia document player 110 to create a new temporal annotation database. Specifically, user interface module 184 receives from user input devices 130 (FIG. 1B) signals generated by the user indicating that a new temporal annotation database is to be created. In response thereto, temporal annotation manager 182 (FIG. 9) creates the new temporal annotation database. In addition, the user can change characteristics of any of temporal annotation databases 800 and 910 to which the user has modify access. Such characteristics include access rights and, in particular, which users or groups of users have which access rights, e.g., read, write, modify, and/or delete access rights.

Among the temporal annotation databases which are currently open by multimedia document player 110, the user specifies one of temporal annotation databases 150 and 910 as "current." When the user creates a new temporal annotation entry, such as temporal annotation entry 300 (FIG. 3), temporal annotation manager 182 (FIG. 9) adds the new temporal annotation entry to the current temporal annotation database. Such simplifies the user interface in that specification of a particular temporal annotation by the user for each newly created temporal annotation is obviated. Of course, for the user to add a new temporal annotation entry to a particular one of temporal annotation databases 800 and 910, the user must have write access to the particular temporal annotation database.

In addition, the user can delete one or more temporal annotation entries from a temporal annotation database and can delete an entire temporal annotation database provided the user has delete access to the temporal annotation database.

When user interface module 184 presents the user with a user interface mechanism by which the user specifies one or more temporal annotation databases to open, it is preferred that user interface module 184 presents the user with a list of a number of temporal annotation databases which are available through computer network 170 (FIG. 1A) and which corresponding to multimedia document 140 (FIG. 9). Interface module 184 identifies temporal annotation database 150 as corresponding to multimedia document 150 in the manner described above. User interface module 184 determines that public temporal annotation databases 910 correspond to multimedia document 140 by reference to a temporal annotation table 502 (FIG. 1C). Temporal annotation table 502 is maintained by a search engine 180 and a query server 190, both of which are all or part or one or more computer processes executing in server computer system 100C. Search engine 180, query server 190, and temporal annotation table 502 can reside in any constituent computer system of computer network 170 or can be distributed among several of the computer systems.

Figure 5:
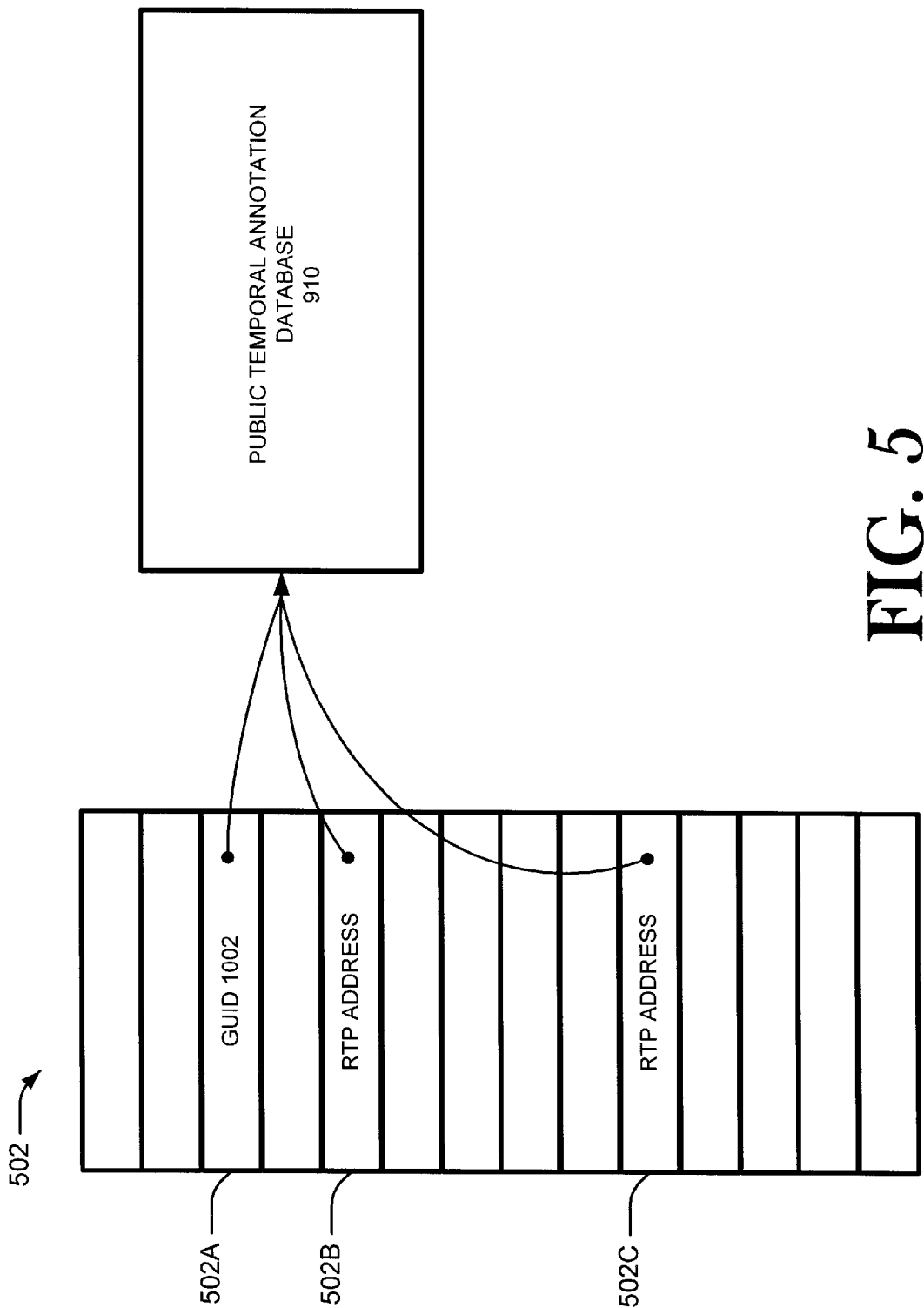
FIG. 5 is a block diagram of a table used in associating the temporal annotation database of FIG. 4 with the multimedia document of FIG. 1C.

Table 502 is shown in greater detail in FIG. 5 and associates temporal annotation databases, e.g., public temporal annotation databases 910 (FIG. 9), with multimedia documents such as multimedia document 140. Table 502 includes multimedia document identifiers of various types, e.g., GUIDs and RTP addresses. For example, table 502 (FIG. 5) includes temporal annotation database references 502A–C to associate public temporal annotation database 910 (FIG. 9) with multimedia document 140 using either GUIDs or RTP addresses. In the illustrative embodiment shown in FIG. 5, temporal annotation database reference 502A associates GUID 1002 (FIG. 10) of multimedia document 140 with public temporal annotation database 910 (FIG. 5). In addition, temporal annotation database reference 502B associates an RTP address of multimedia document 140 (FIG. 1) with public temporal annotation database 910 (FIG. 5). Furthermore, temporal annotation database reference 502C associates an RTP address of a component of multimedia document 140 (FIG. 9), e.g., motion video content 902, with public temporal annotation database 910 (FIG. 5). Thus, public temporal annotation database 910 can be located as the temporal annotation database associated with multimedia document 140 (FIG. 1) by reference to GUID 1002 of multimedia document 140 (FIG. 10), the RTP address of multimedia document 140, or the RTP address of a component of multimedia document 140, e.g., motion video content 902.

In addition, table 502 can include GUID 1002 (FIG. 5) and other references to multimedia document 140 (FIG. 9) to associate multiple public temporal annotation databases with multimedia document 140. Specifically, temporal annotation manager 182 submits a query to query server 190 (FIG. 1C) requesting all public temporal annotation databases associated with multimedia document 140. Query server 190 retrieves from table 502 references to all public temporal annotation databases associated with multimedia document 140 and sends the references to temporal annotation manager 182 in response to the query. Accordingly, temporal annotation manager 182 can obtain a list of public temporal annotation databases associated with multimedia document 140 to thereby allow the user to select from the list of public temporal annotation databases to open for synchronized playback with the substantive content of multimedia document 140. Once temporal annotation manager 182 has obtained the list of public temporal annotation databases, temporal annotation manager 182 can request those public annotation databases from annotation servers such as annotation server 192. In response to the request, annotation server 192 sends temporal annotation database 910 in its entirety to temporal annotation manager 182, in one embodiment, and streams temporal annotation database 910 to temporal annotation manager 182, in an alternative embodiment.

In addition to retrieving temporal annotations in response to retrieval requests, annotation server 192 also creates and stores temporal annotation entries within temporal annotation database 910 in response to post requests. Specifically, temporal annotation manager 182 determines that a post request received from user interface module 184 is to be stored in temporal annotation database 910 rather than temporal annotation database 150, e.g., by determining that the user has identified temporal annotation database 910 as current. After making such a determination, temporal annotation manager 182 forwards the post request to annotation server 192 which creates a temporal annotation entry and stores the temporal annotation entry in temporal annotation database 910 in a manner which is directly analogous to the manner in which temporal annotation manager 182 creates and stores temporal annotation entry 300 in temporal annotation database 150.

Temporal annotation table 502 can be populated with associations between multimedia documents and temporal annotation databases in a number of ways. In one embodiment, every time the user creates a new temporal annotation database and gives at least one other user read access to the new temporal annotation database, temporal annotation manager 182 (FIG. 1C) sends to search engine 180 data identifying the new temporal annotation database and the associated multimedia document, e.g., multimedia document 140. In response thereto, search engine 180 forms a temporal annotation database reference, e.g., temporal annotation database reference 502A (FIG. 5), representing the association between the multimedia document and the temporal annotation database and includes the temporal annotation database reference in temporal annotation table 502. In another embodiment, search engine 180 (FIG. 1C) periodically (i) searches all constituent computer systems of computer network 170 for temporal annotation databases, (ii) determines with which multimedia document each temporal annotation database is associated by reference to identifier field 402 (FIG. 4) of the located temporal annotation database, (iii) forms a temporal annotation database reference, e.g., temporal annotation database reference 502A (FIG. 5), representing the association, and (iv) includes the temporal annotation database reference in temporal annotation table 502. Of course, search engine 180 (FIG. 1C) can only form temporal annotation database references for temporal annotation database to which search engine 180 has at least read access. In a third embodiment, both mechanisms are used to populate temporal annotation table 502.

Thus, collections of public temporal annotations can be published and are made accessible to viewers of multimedia documents such that viewers can also view temporal annotations created by other in a temporal, multimedia context. Such adds tremendous flexibility and value to multimedia documents and enables widespread, distributed, collaborative work involving multimedia presentation of information.

Hardware Components of Computer System 100

As described above, multimedia document player 110 (FIG. 1B) executes within client computer system 100A. Computer systems 100A–D (FIG. 1A) are generally of the same structure and the following description of client computer system 100A is also applicable to computer systems 100B–D. Client computer system 100A (FIG. 1B) includes a processor 102 and memory 104 which is coupled to processor 102 through an interconnect 106. Interconnect 106 can be generally any interconnect mechanism for computer system components and can be, e.g., a bus, a crossbar, a mesh, a torus, or a hypercube. Processor 102 fetches from memory 104 computer instructions and executes the fetched computer instructions. In addition, processor 102 can fetch computer instructions through a computer network 170 through network access circuitry 160 such as a modem or ethernet network access circuitry. Processor 102 also reads data from and writes data to memory 104 and sends data and control signals through interconnect 106 to one or more computer display devices 120 and receives data and control signals through interconnect 106 from one or more computer user input devices 130 in accordance with fetched and executed computer instructions.

Memory 104 can include any type of computer memory and can include, without limitation, randomly accessible memory (RAM), read-only memory (ROM), and storage devices which include storage media such as magnetic and/or optical disks. Memory 104 includes multimedia document player 110 which is all or part of a computer process which in turn executes within processor 102 from memory 104. A computer process is generally a collection of computer instructions and data which collectively define a task performed by computer system 100.

Each of computer display devices 120 can be any type of computer display device including without limitation a printer, a cathode ray tube (CRT), a light-emitting diode (LED) display, or a liquid crystal display (LCD). Computer display devices 120 each receive from processor 102 control signals and data and, in response to such control signals, display the received data. In addition, loudspeaker 120B plays audible sounds received from audio processing circuitry 180. Audio processing circuitry 180 receives digital audio signals and control signals from processor 102 and produces analog audio signals in accordance therewith for reproduction through loudspeaker 120B. Computer display devices 120, and the control thereof by processor 102, are conventional.

Each of user input devices 130 can be any type of user input device including, without limitation, a keyboard, a numeric keypad, or a pointing device such as an electronic mouse, trackball, lightpen, touch-sensitive pad, digitizing tablet, thumb wheels, joystick, or voice recognition device. Each of user input devices generates signals in response to physical manipulation by a user and transmits those signals through interconnect 106 to processor 102. In addition, a microphone 130A receives audio signals from the user and presents those audio signals to audio processing circuitry 180 which converts the audio signals to digital audio signals for storage in memory 104 or processing by processor 102. Furthermore, audio/video capture circuitry 130B receives audio and/or video signals from an audio/video source 190 and converts the received audio and/or video signals to a digital form suitable for storage in memory 104 or processing by processor 102. Audio/video source 190 can be, for example, a video camera, a video cassette player, or a laserdisk or digital video disk (DVD) player.

As described above, multimedia document player 110 executes within processor 102 from memory 104. Specifically, multimedia document player 110 is all or part of a computer process executing within client computer system 100A, i.e., processor 102 fetches computer instructions of multimedia document player 110 from memory 104 and executes those computer instructions. Processor 102, in executing multimedia document player 110, reads multimedia document 140 from server computer system 100B (FIG. 1C) through network 170 (FIG. 1B) and network access circuitry 160, and displays multimedia document 140 (FIG. 1C) in one or more of computer display devices 120 (FIG. 1B). Specifically, execution of multimedia document player 110 displays the content of multimedia document 140 in display screen 122 of computer display device 120A and/or out of loudspeaker 120B through audio processing circuitry 180. Multimedia document player 110 can be a conventional multimedia document browser such as the Internet Explorer program available from Microsoft Corporation of Redmond, Wash. in which novel functionality described herein is implemented as plug-ins or by adaptation of such a conventional multimedia document browser to provide such novel functionality.

In this illustrative embodiment, processor 102 is any of the Pentium series of microprocessors available from Intel Corporation of Santa Clara, Calif. and computer system 100 is compatible with the PC personal computer available from International Business Machines of Atlanta, Ga. operating under the WINDOWS 95 operating system available from Microsoft Corporation of Redmond, Wash. WINDOWS, Internet Explorer, and Microsoft are trademarks or registered trademarks of Microsoft Corporation in the United States and other countries.

Temporal annotation manager 182 (FIG. 1) and user interface module 184 are also each all or part of a computer process executing in client computer system to exhibit the behavior described above. Similarly, search engine 180, query server 190, annotation server 192, web server 186, and video/audio server 188 are each implemented as all or part of computer processes in this illustrative embodiment.

Graphical User Interface Techniques

As described briefly above, multimedia display 200 (FIG. 2) includes a number of control buttons 220, each of which is a GUI button. A GUI button is a generally rectangular or circular representation on a display screen such as display screen 122 which a user can actuate using standard graphical user interface techniques. Typically, a user actuates a GUI button by positioning a cursor (not shown) over the GUI button and actuating a physical button or similar actuation mechanism on a user input device such as any of user input devices 130. The user moves the cursor by physical manipulation one of user input devices 130. For example, movement of an electronic mouse over a generally flat surface is generally detected by the electronic mouse either mechanically or optically and the electronic mouse generates signals representing the direction and distance of movement of the electronic mouse through interconnect 106 to processor 102. Processor 102 effects corresponding movements of a cursor in display screen 122 to provide substantially immediate feedback to the user regarding the current position within display screen 122 indicated by the current state of the electronic mouse. With the cursor over a GUI button, the user can actuate the GUI button by actuating a physical button on the electronic mouse to thereby generate and transmit to processor 102 signals so indicating.

Actuation of a GUI button by a user is detected by a computer process such as multimedia document player 110 (FIG. 9) and the computer process takes action in response to the detected actuation. Multimedia document player 110 includes a user interface module 184 which effects display of control buttons 220 (FIG. 2), detects actuation of any of control buttons 220, and takes action in response thereto in a manner described more completely above.

The above description is illustrative only and is not limiting. For example, while it is described that user-authored content is formed within a temporal context selected by a human user of client computer system 100A (FIG. 1B), it is appreciated that artificial intelligence techniques employing voice recognition and/or image process techniques, for example, can be used to automatically select temporal contexts for annotation and to automatically author content for inclusion in the playback of a multimedia document in the form of a temporal annotation. The present invention is therefore limited only by the claims which follow.

What is claimed is:

1. A method for displaying a multimedia document comprising the steps of:

retrieving the multimedia document from a first computer system, the multimedia document comprising temporally-dimensioned content;

determining, from an identifier of the multimedia document, that a temporal annotation is associated with the multimedia document;

retrieving the temporal annotation;

displaying the temporally-dimensioned content; and while displaying the temporally-dimensioned content, displaying the temporal annotation over a range of relative time within the temporally-dimensioned content.

2. The method of claim 1 wherein the identifier of the multimedia document is a globally unique identifier (GUID) that identifies one or more components of the multimedia document, the GUID comprising:

an Internet Protocol (IP) address of a capturing computer that captured the temporally-dimensioned content of the multimedia document; and a time stamp representing the time the temporally-dimensioned content of the multimedia document was captured.

3. The method of claim 1 wherein the identifier of the multimedia document is a universal resource name within a computer network to which the first computer system is connected.

4. The method of claim 1 wherein the identifier of the multimedia document is a universal resource locator (URL) within a computer network to which the first computer system is connected.

5. The method of claim 1 wherein the identifier of the multimedia document is a realtime transport protocol (RTP) address.

6. The method of claim 1 wherein the step of determining comprises the steps of:

deriving, from the identifier, a location of a database stored in a second computer system; and determining that the database includes the temporal annotation.

7. The method of claim 6 wherein the first computer system and the second computer system are the same computer system.

8. The method of claim 1 wherein the step of determining comprises the steps of:

retrieving, from a first database, a record which represents an association of the identifier with a location of a second database stored in a second computer system; and determining that the second database includes the temporal annotation.

9. The method of claim 8 wherein the first computer system and the second computer system are the same computer system.

10. A method for managing temporal annotations of a multimedia document, the multimedia document comprising temporally-dimensioned content, the method comprising the steps of:

receiving a post request which specifies (i) identification data representing an identifier of the multimedia document, (ii) content data representing substantive content of a temporal annotation, and (iii) relative time data representing a range of relative time within the temporally-dimensioned content with which the temporal annotation is associated;

forming a temporal annotation entry which includes the content data and the relative time data; and storing the temporal annotation entry in a pre-existing temporal annotation database such that the temporal annotation entry is associated with the multimedia document.

11. The method of claim 10 wherein the post request further includes author data which identifies a user as the author of the content data, the method further comprising the step of:

including the author data in the temporal annotation entry.

12. The method of claim 10 further comprising the steps of:

forming temporal annotation identifier data which identifies the temporal annotation entry; and including the temporal annotation identifier data in the temporal annotation entry.

13. The method of claim 10 further comprising the steps of:

determining a creation time of the temporal annotation entry; and including creation time stamp data representing the creation time in the temporal annotation entry.

14. The method of claim 13 wherein the step of determining a creation time comprises parsing creation time data representing the creation time from the post request.

15. The method of claim 10 further comprising the steps of:

receiving a retrieve request which specifies the identifier of the multimedia document;

retrieving the temporal annotation entry from the pre-existing temporal annotation database; and returning, in response to the retrieve request, the content data and the relative time data.

16. A method for selectively incorporating display of a temporal annotation in a display of a multimedia document, the method comprising the steps of:

requesting one or more temporal annotations which are related to the multimedia document from a temporal annotation server;

receiving the one or more temporal annotations from the temporal annotation server;

displaying temporally-dimensioned content of the multimedia document to a user;

filtering the one or more temporal annotations according to filtering criteria selected by the user to identify a selected temporal annotation; and incorporating display of the selected temporal annotation over a range of relative time within the display of the temporally-dimensioned content.

17. The method of claim 16 wherein the filtering criteria include identifiers of one or more selected authors of the one or more temporal annotations.

18. The method of claim 16 wherein the filtering criteria include specification of a period of time during which the selected temporal annotations are created.

19. The method of claim 18 wherein the period of time is specified as a range of dates.

20. The method of claim 16 wherein the step of filtering comprises the step of:

in the step of requesting, specifying the filtering criteria; and in the step of receiving, receiving only the selected temporal annotations.

21. A computer readable medium useful in association with a computer which includes a processor and a memory, the computer readable medium including computer instructions which are configured to cause the computer to display a multimedia document by performing the steps of:

retrieving the multimedia document from a first computer system, the multimedia document comprising temporally-dimensioned content;

determining, from an identifier of the multimedia document, that a temporal annotation is associated with the multimedia document;

retrieving the temporal annotation;

displaying the temporally-dimensioned content; and while displaying the temporally-dimensioned content, displaying the temporal annotation over a range of relative time within the temporally-dimensioned content.

22. The computer readable medium of claim 21 wherein the identifier of the multimedia document is a globally unique identifier (GUID) that identifies one or more components of the multimedia document, the GUID comprising:

an Internet Protocol (IP) address of a capturing computer that captured the temporally-dimensioned content of the multimedia document; and a time stamp representing the time the temporally-dimensioned content of the multimedia document was captured.

23. The computer readable medium of claim 21 wherein the identifier of the multimedia document is a universal resource name within a computer network to which the first computer system is connected.

24. The computer readable medium of claim 21 wherein the identifier of the multimedia document is a universal resource locator (URL) within a computer network to which the first computer system is connected.

25. The computer readable medium of claim 21 wherein the identifier of the multimedia document is a realtime transport protocol (RTP) address.

26. The computer readable medium of claim 21 wherein the step of determining comprises the steps of:

deriving, from the identifier, a location of a database stored in a second computer system; and determining that the database includes the temporal annotation.

27. The computer readable medium of claim 26 wherein the first computer system and the second computer system are the same computer system.

28. The computer readable medium of claim 21 wherein the step of determining comprises the steps of:

retrieving, from a first database, a record which represents an association of the identifier with a location of a second database stored in a second computer system; and determining that the second database includes the temporal annotation.

29. The computer readable medium of claim 28 wherein the first computer system and the second computer system are the same computer system.

30. A computer readable medium useful in association with a computer which includes a processor and a memory, the computer readable medium including computer instructions which are configured to cause the computer to manage temporal annotations of a multimedia document comprising temporally-dimensioned content by performing the steps of:

receiving a post request which specifies (i) identification data representing an identifier of the multimedia document, (ii) content data representing substantive content of a temporal annotation, and (iii) relative time data representing a range of relative time within the temporally-dimensioned content with which the temporal annotation is associated;

forming a temporal annotation entry which includes the content data and the relative time data; and storing the temporal annotation entry in a pre-existing temporal annotation database such that the temporal annotation entry is associated with the multimedia document.

31. The computer readable medium of claim 30 wherein the post request further includes author data which identifies a user as the author of the content data, and wherein the computer instructions are further configured to cause the computer to perform the additional step of:

including the author data in tile temporal annotation curry.

32. The computer readable medium of claim 30 wherein the computer instructions are further configured to cause the computer to perform the additional steps of:

forming temporal annotation identifier data which identifies the temporal annotation entry; and including the temporal annotation identifier data in the temporal annotation entry.

33. The computer readable medium of claim 30 wherein the computer instructions are further configured to cause the computer to perform the additional steps of:

determining a creation time of the temporal annotation entry; and including creation time stamp data representing the creation time in the temporal annotation entry.

34. The computer readable medium of claim 33 wherein the step of determining a creation time comprises the step of:

parsing creation time data representing the creation time from the post request.

35. The computer readable medium of claim 32 wherein the computer instructions are further configured to cause the computer to perform the additional steps of:

receiving a retrieve request which specifies the identifier of the multimedia document;

retrieving the temporal annotation entry from the pre-existing temporal annotation database; and returning, in response to the retrieve request, the content data and the relative time data.

36. A computer readable medium useful in association with a computer which includes a processor and a memory, the computer readable medium including computer instructions which are configured to cause the computer to selectively incorporate display of a temporal annotation in a display of a multimedia document by performing the steps of:

requesting one or more temporal annotations which are related to the multimedia document from a temporal annotation server;

receiving the one or more temporal annotations from the temporal annotation server;

displaying temporally-dimensioned content of the multimedia document to a user;

filtering the one or more temporal annotations according to filtering criteria selected by the user to identify a selected temporal annotation; and incorporating display of the selected temporal annotation over a range of relative time within the display of the temporally-dimensioned content.

37. The computer readable medium of claim 36 wherein the filtering criteria include identifiers of one or more selected authors of the one or more temporal annotations.

38. The computer readable medium of claim 36 wherein the filtering criteria include specification of a period of time during which the selected temporal annotations are created.

39. The computer readable medium of claim 38 wherein the period of time is specified as a range of dates.

40. The computer readable medium of claim 36 wherein the step of filtering comprises the steps of:

in the step of requesting, specifying the filtering criteria; and in the step of receiving, receiving only the selected temporal annotations.

41. A computer system comprising:

a processor;

a memory operatively coupled to the processor; and a temporal annotation manager which executes in the processor from the memory and which, when executed by the processor, causes the computer to display a multimedia document by performing the steps of:

retrieving the multimedia document from the computer system, the multimedia document comprising temporally-dimensioned content;

determining, from an identifier of the multimedia document, that a temporal annotation is associated with the multimedia document;

retrieving the temporal annotation;

displaying the temporally-dimensioned content; and while displaying the temporally-dimensioned content, displaying the temporal annotation over a range of relative time within the temporally-dimensioned content.

42. The computer system of claim 41 wherein the identifier of the multimedia document is a globally unique identifier (GUID) that identifies one or more components of the multimedia document, the GUID comprising:

an Internet Protocol (IP) address of a capturing computer that captured the temporally-dimensioned content of the multimedia document; and a time stamp representing the time the temporally-dimensioned content of the multimedia document was captured.

43. The computer system of claim 41 wherein the identifier of the multimedia document is a universal resource name within a computer network to which the computer system is connected.

44. The computer system of claim 41 wherein the identifier of the multimedia document is a universal resource locator (URL) within a computer network to which the computer system is connected.

45. The computer system of claim 41 wherein the identifier of the multimedia document is a realtime transport protocol (RTP) address.

46. The computer system of claim 41 wherein the step of determining comprises the steps of:

deriving, from the identifier, a location of a database stored in a second computer system; and determining that the database includes the temporal annotation.

47. The computer system of claim 46 wherein the computer system and the second computer system are the same computer system.

48. The computer system of claim 41 wherein the step of determining comprises the steps of:

retrieving, from a first database, a record which represents an association of the identifier with a location of a second database stored in a second computer system; and determining that the second database includes the temporal annotation.

49. The computer system of claim 48 wherein the computer system and the second computer system are the same computer system.

50. A computer system comprising:

a processor;

a memory operatively coupled to the processor; and a temporal annotation manager which executes in the processor from the memory and which, when executed by the processor, causes the computer to manage temporal annotations of a multimedia document comprising temporally-dimensioned content by performing the steps of:

receiving a post request which specifies (i) identification data representing an identifier of the multimedia document, (ii) content data representing substantive content of a temporal annotation, and (iii) relative time data representing a range of relative time within the temporally-dimensioned content with which the temporal annotation is associated;

forming a temporal annotation entry which includes the content data and the relative time data; and storing the temporal annotation entry in a pre-existing temporal annotation database such that the temporal annotation entry is associated with the multimedia document.

51. The computer system of claim 50 wherein the post request further includes author data which identifies a user as the author of the content data, and wherein the temporal annotation manager causes the computer to perform the additional step of:

including the author data in the temporal annotation entry.

52. The computer system of claim 50 wherein the temporal annotation manager causes the computer to perform the additional steps of:

forming temporal annotation identifier data which identifies the temporal annotation entry; and including the temporal annotation identifier data in the temporal annotation entry.

53. The computer system of claim 50 wherein the temporal annotation manager causes the computer to perform the additional steps of:

determining a creation time of the temporal annotation entry; and including creation time stamp data representing the creation time in the temporal annotation entry.

54. The computer system of claim 53 wherein the step of determining a creation time comprises the step of:

parsing creation time data representing the creation time from the post request.

55. The computer system of claim 50 wherein the temporal annotation manager causes the computer to perform the additional steps of:

receiving a retrieve request which specifies the identifier of the multimedia document;

retrieving the temporal annotation entry from the pre-existing temporal annotation database; and returning, in response to the retrieve request, the content data and the relative time data.

56. A computer system comprising:

a processor;

a memory operatively coupled to the processor; and a multimedia document player which executes in the processor from the memory and which, when executed by the processor, causes the computer to selectively incorporate display of a temporal annotation in a display of a multimedia document by performing the steps of:

requesting one or more temporal annotations which are related to the multimedia document from a temporal annotation server;

receiving the one or more temporal annotations from the temporal annotation server;

displaying temporally-dimensioned content of the multimedia document to a user;

filtering the one or more temporal annotations according to filtering criteria selected by the user to identify a selected temporal annotation; and incorporating display of the selected temporal annotation over a range of relative time within the display of the temporally-dimensioned content.

57. The computer system of claim 56 wherein the filtering criteria include identifiers of one or more selected authors of the one or more temporal annotations.

58. The computer system of claim 56 wherein the filtering criteria include specification of a period of time during which the selected temporal annotations are created.

59. The computer system of claim 58 wherein the period of time is specified as a range of dates.

60. The computer system of claim 56 wherein the step of filtering comprises the step of:

in the step of requesting, specifying the filtering criteria; and in the step of receiving, receiving only the selected temporal annotations.

61. A method of annotating a multimedia document, comprising:

displaying temporally-dimensioned content of the multimedia document; and synchronizing a temporal annotation to a range of relative time within the temporally-dimensioned content, wherein the synchronizing comprises associating the temporal annotation with the multimedia document, the associating further comprising:

submitting a temporal annotation post request that includes (i) an identifier of the multimedia document, (ii) substantive content of the temporal annotation, and (iii) the range of relative time within the temporally-dimensioned content with which the temporal annotation is associated;

forming a temporal annotation entry that includes the substantive content and the range of relative time; and storing the temporal annotation entry in a pre-existing temporal annotation database such that the temporal annotation entry is associated with the multimedia document.

62. The method of claim 61, wherein the temporal annotation post request further includes an author identifier specifying the author of the substantive content, the method further comprising:

including the author identifier in the temporal annotation entry.

63. The method of claim 61, further comprising:

forming a temporal annotation identifier to identify the temporal annotation entry; and including the temporal annotation identifier in the temporal annotation entry.

64. The method of claim 61, further comprising:

determining a creation time of the temporal annotation entry; and including a creation time stamp representing the creation time in the temporal annotation entry.

65. A method of displaying a multimedia document, comprising:

retrieving the multimedia document from a first computer;

determining from an identifier of the multimedia document that a temporal annotation is associated with the multimedia document;

retrieving the temporal annotation;

displaying temporally-dimensioned content of the multimedia document; and over a range of relative time within the temporally-dimensioned content, displaying the temporal annotation, wherein the identifier of the multimedia document is a globally unique identifier (GUID) that identifies one or more components of the multimedia document, the GUID comprising:

an Internet Protocol (IP) address of a capturing computer that captured the temporally-dimensioned content of the multimedia document; and a time stamp representing the time the temporally-dimensioned content of the multimedia document was captured.

66. A method of recursively annotating a multimedia document, comprising:

displaying temporally-dimensioned content of the multimedia document;

while displaying the temporally-dimensioned content of the multimedia document, displaying a first temporal annotation associated with the multimedia document; and synchronizing a second temporal annotation to a range of relative time within the first temporal annotation, wherein the synchronizing comprises associating the second temporal annotation with the multimedia document, the associating further comprising:

submitting a temporal annotation post request that includes (i) an identifier of the multimedia document, (ii) substantive content of the second temporal annotation, and (iii) the range of relative time within the first temporal annotation with which the second temporal annotation is associated;

forming a temporal annotation entry that includes the substantive content and the range of relative time; and storing the temporal annotation entry in a pre-existing temporal annotation database such that the temporal annotation entry is associated with the multimedia document.

67. The method of claim 66, wherein the temporal annotation post request further includes an author identifier specifying the author of the substantive content, the method further comprising:

including the author identifier in the temporal annotation entry.

68. The method of claim 66, further comprising:

forming a temporal annotation identifier to identify the temporal annotation entry; and including the temporal annotation identifier in the temporal annotation entry.

69. The method of claim 66, further comprising:

determining a creation time of the temporal annotation entry; and including a creation time stamp representing the creation time in the temporal annotation entry.

70. A method of displaying a multimedia document, comprising:

retrieving the multimedia document from a first computer, the multimedia document comprising temporally-dimensioned content;

determining from an identifier of the multimedia document that one or more temporal annotations are associated with the multimedia document;

displaying a table of contents associated with the multimedia document, the table of contents comprising the one or more temporal annotations;

based on a selection of a temporal annotation from the table of contents, initiating a display of the temporally-dimensioned content at a relative time within the temporally-dimensioned content, the temporal annotation being synchronized to the relative time.

71. The method of claim 70, further comprising:

retrieving the temporal annotation from a second computer; and displaying the temporal annotation at the relative time along with the display of the temporally-dimensioned content.

72. The method of claim 70, further comprising:

displaying information about a particular temporal annotation in response to actuating the particular temporal annotation with a user interface device.

73. The method of claim 72, wherein the user interface device is a cursor and the actuating is positioning the cursor over the particular temporal annotation for a predetermined period of time.

74. A method for displaying a multimedia document comprising the steps of:

retrieving the multimedia document from a first computer system, the multimedia document comprising temporally-dimensioned content;

determining, from an identifier of the multimedia document, that one or more temporal annotations are associated with the multimedia document, each of the one or more temporal annotations being associated with a range of relative time within the temporally-dimensioned content;

retrieving the one or more temporal annotations;

displaying the temporally-dimensioned content; and displaying the one or more temporal annotations.

75. The method of claim 74, wherein the displaying the one or more temporal annotations comprises displaying a table of contents containing selectable items, each selectable item representing a selectable temporal annotation.

76. The method of claim 75, further comprising displaying the temporally-dimensioned content over a range of relative time within the temporally-dimensioned content with which a selected temporal annotation is associated.

77. The method of claim 75, wherein each selectable item comprises an except from a selectable temporal annotation.

\* \* \* \* \*

UNITED STATES PATENT AND TRADEMARK OFFICE
CERTIFICATE OF CORRECTION

PATENT NO. : 6,546,405 B2
DATED : April 8, 2003
INVENTOR(S) : Gupta et al.

It is certified that error appears in the above-identified patent and that said Letters Patent is hereby corrected as shown below:

Column 1,
Line 64, replace "Often" with -- often --.

Signed and Sealed this

Seventeenth Day of June, 2003

JAMES E. ROGAN
*Director of the United States Patent and Trademark Office*